United States Patent
Frenne et al.

(10) Patent No.: US 10,462,796 B2
(45) Date of Patent: Oct. 29, 2019

(54) SYSTEMS AND METHODS OF REDUCING INTERFERENCE IN A WIRELESS COMMUNICATIONS SYSTEM

(71) Applicant: Telefonaktiebolaget LM Ericsson (publ), Stockholm (SE)

(72) Inventors: Mattias Frenne, Uppsala (SE); Svante Bergman, Hägersten (SE); Martin Hessler, Linköping (SE); Lars Lindbom, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/736,664

(22) PCT Filed: Oct. 5, 2017

(86) PCT No.: PCT/EP2017/075366
§ 371 (c)(1),
(2) Date: Dec. 14, 2017

(87) PCT Pub. No.: WO2018/141425
PCT Pub. Date: Aug. 9, 2018

(65) Prior Publication Data
US 2018/0242327 A1  Aug. 23, 2018

Related U.S. Application Data

(60) Provisional application No. 62/455,388, filed on Feb. 6, 2017.

(51) Int. Cl.
*H04W 72/04* (2009.01)
*H04W 72/08* (2009.01)
*H04B 7/0456* (2017.01)
*H04L 25/02* (2006.01)
*H04L 5/00* (2006.01)
*H04W 24/10* (2009.01)
*H04B 7/0404* (2017.01)
*H04B 7/06* (2006.01)

(52) U.S. Cl.
CPC ........ *H04W 72/082* (2013.01); *H04B 7/0404* (2013.01); *H04B 7/0456* (2013.01);
(Continued)

(58) Field of Classification Search
CPC . H04W 72/082; H04W 24/10; H04W 72/042; H04B 7/0404; H04B 7/0456;
(Continued)

(56) References Cited

U.S. PATENT DOCUMENTS

2017/0005764 A1* 1/2017 Park ................. H04J 11/005
2017/0288743 A1* 10/2017 Nam ................. H04B 7/024
(Continued)

OTHER PUBLICATIONS

On QCL Configurations in NR—3GPP TSG-RAN WG1 # 86bis (R1-1610274), Oct. 2016.*
(Continued)

*Primary Examiner* — Lakeram Jangbahadur
(74) *Attorney, Agent, or Firm* — Coats & Bennett, PLLC

(57) ABSTRACT

Systems and method of reducing interference in a wireless communication system are provided. In one exemplary embodiment, a method by a wireless device (105, 200, 300a, 300b, 500, 1105, 1205, 1207) comprises determining (409, 909) an uplink precoder (107) based on channel measurements on first and second downlink reference signal resources. Further, the precoder enables a transmission (113) on an uplink reference signal resource that is precoded with the uplink precoder and that is quasi co-located (QCL) (121) with a transmission (111) on the first downlink reference signal resource but not QCL (123) with a transmission (115) on the second downlink reference signal resource.

22 Claims, 11 Drawing Sheets

(52) U.S. Cl.
CPC .......... *H04L 5/0048* (2013.01); *H04L 5/0062* (2013.01); *H04L 25/0204* (2013.01); *H04L 25/0224* (2013.01); *H04W 24/10* (2013.01); *H04W 72/042* (2013.01); *H04B 7/0617* (2013.01); *H04L 25/0222* (2013.01)

(58) Field of Classification Search
CPC ... H04B 7/0617; H04L 5/0062; H04L 5/0048; H04L 25/0224; H04L 25/0204; H04L 25/0222
See application file for complete search history.

(56) References Cited

U.S. PATENT DOCUMENTS

| | | | | |
|---|---|---|---|---|
| 2018/0167183 A1* | 6/2018 | Zhang | ................... | H04B 7/0456 |
| 2018/0205440 A1* | 7/2018 | Enescu | ................ | H04B 7/0695 |

OTHER PUBLICATIONS

On QCL for NR (3GPP TSG WG1-NR R1-1700934), Jan. 2017.*
Nokia et al., "On QCL Configurations in NR", 3GPP TSG-RAN WG1#86bis, Oct. 10-14, 2016, pp. 1-4, Lisbon, Portugal, R1-1610274.
LG Electronics, "On beam relationship between control channel and data channel", 3GPP TSG RAN WG1 Ad-Hoc Meeting, Jan. 16-20, 2017, pp. 1-4, Spokane, US, R1-1700472.
Samsung, "On QCL for NR", 3GPP TSG RAN WG1-NR, Jan. 16-20, 2017, pp. 1-8, Spokane, US, R1-1700934.
Zte et al., "QCL/QCB design for UL MIMO", 3GPP TSG WG1 NR Ad-Hoc Meeting, Jan. 16-20, 2017, pp. 1-6, Spokane, US, R1-1700141.
Huawei et al., "Potential enhancements and specification impact analysis of non-coherent JT", 3GPP TSG RAN WG1 Meeting #86bis, Oct. 10-14, 2016, pp. 1-6, Lisbon, Portugal, R1-1608610.

* cited by examiner

SYSTEMS AND METHODS OF REDUCING INTERFERENCE IN A WIRELESS COMMUNICATIONS SYSTEM

FIELD OF DISCLOSURE

The present disclosure relates generally to the field of communications, and in particular to reducing interference in a wireless communication system.

BACKGROUND

One of the principles guiding the design of the 5th generation mobile networks (5G) and New Radio (NR) system is the transparency of the network to an user equipment (UE). As such, the UE is able to demodulate and decode its intended channels without specific knowledge of scheduling assignments for other UEs or network deployments. For example, antenna ports belonging to different transmission points can transmit different downlink control information (DCI) messages on a physical downlink control channel (PDCCH). While there are various reasons for different transmission points transmitting control signaling to a UE, one application relates to distributing parts of the scheduling algorithm to different transmission points so that downlink transmissions are associated with a different transmission point than uplink transmissions. In this case, it makes sense to schedule downlink and uplink transmissions with control signaling provided directly from the respective transmission points.

In another application, different transmission points simultaneously transmit data to a UE to increase the data rate or to support handover between transmission points. In yet another application, a serving transmission point transmits control information to a UE while other transmission points (e.g., pico nodes) transmit data to the UE. In these applications, different transmission points may transmit control signaling such as on a PDCCH in the same subframe to the UE. Further, for each application, UEs might not be aware of the geographical location of each antenna port.

A demodulation reference signal (DMRS) or a UE-specific reference signal (RS) is employed for demodulation of data channels and possibly certain control channels (e.g., PDCCH). A UE-specific RS relieves the UE from having to know many of the properties of the transmission and thus, allows flexible transmission schemes to be used from the network side. This is referred to as transmission transparency (with respect to the UE). However, one problem is that the estimation accuracy of a UE-specific RS (i.e., channel properties) may not be good enough in some situations.

Geographical separation of RS ports implies that instantaneous channel coefficients from each port towards the UE are in general different. Furthermore, even the statistical properties of the channels for different antenna ports and RS types may be significantly different. Examples of such statistical properties include the received power for each antenna port, the delay spread, the Doppler spread, the received timing (i.e., the timing of the first significant channel tap), the number of significant channel taps, and the frequency shift. In LTE, nothing may be assumed about the properties of the channel corresponding to an antenna port based on the properties of the channel of another antenna port. This is in fact a key part of maintaining transmission transparency. Based on the above observations, the UE needs to perform independent estimation for each antenna port of interest for each transmission. This results in occasionally inadequate channel estimation quality for certain antenna ports, leading to undesirable link and system performance degradation.

In LTE and NR, reference signals used for channel estimation may be associated with respective antenna ports. In one example, over one antenna port, a reference signal or set of references signals may be transmitted. From different antenna ports, different reference signals or different sets of reference signals may be sent so that an antenna port may be distinguished from another antenna port by means of the transmitted reference signals or sets of reference signals. Hence, the UE may estimate the channel from one antenna port by using the associated reference signal. Further, a certain data or control transmission is associated with an antenna port, allowing the UE to use the reference signal for that antenna port to estimate the channel used to demodulate the associated control or data channel. Also, the data or control channel is transmitted using that antenna port.

Furthermore, simultaneous uplink data transmissions by many UEs to desired transmission points, e.g. base stations, in a wireless communication system are typically not only received by the desired base stations but are also received in the form of interference by other base stations. Such uplink interference exacerbates uplink precoded transmissions based on channel reciprocity. In particular, interference for UEs that select the uplink precoder (e.g., non-codebook-based precoding approach) should be kept low since the chosen precoder may not be under network control. Accordingly, there is a need for improved techniques for reducing interference in a wireless communication system. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later. Systems and methods of reducing interference in a wireless communication system are described herein. According to one aspect, a method by a wireless device comprises determining an uplink precoder based on channel measurements on first and second downlink reference signal resources. Further, the precoder enables a transmission on an uplink reference signal resource that is precoded with the uplink precoder and that is quasi co-located (QCL) with a transmission on the first downlink reference signal resource but not QCL with a transmission on the second downlink reference signal resource.

According to another aspect, the step of determining the uplink precoder may be so that the transmission on the uplink reference signal suppresses transmission on an uplink channel that is reciprocally associated with the second downlink reference signal resource.

According to another aspect, the step of determining the uplink precoder may be so that the transmission on the uplink reference signal resource is suppressed towards the transmission on the second downlink reference signal resource.

According to another aspect, the suppression of the transmission on the uplink channel that is reciprocally associated with the second downlink reference signal is responsive to determining that the transmission on the uplink reference signal resource will not be QCL with the transmission on the second downlink reference signal resource.

According to another aspect, the method may include transmitting an uplink reference signal on an uplink reference signal resource. Further, the uplink reference signal may be precoded with the uplink precoder so that the transmission on the uplink reference signal resource is QCL with the transmission on the first downlink reference signal resource but not QCL with the transmission on the second downlink reference signal resource.

According to another aspect, the step of transmitting the uplink reference signal on the uplink reference signal resource may be limited by an amount of interference the transmission on the uplink reference signal resource is estimated to cause on an uplink channel that is reciprocally associated with the second downlink reference signal resource.

According to another aspect, the step of transmitting the uplink reference signal on the uplink reference signal resource may be so that an amount of interference the transmission on the uplink reference signal resource is estimated to cause on the uplink channel that is reciprocally associated with the second downlink reference signal resource is below a predetermined threshold.

According to another aspect, the step of transmitting the uplink reference signal on the uplink reference signal resource may be so that the transmission on the uplink reference signal resource suppresses transmission on an uplink channel that is reciprocally associated with the second downlink reference signal resource.

According to another aspect, the method may include determining that the transmission on the uplink reference signal resource will be QCL with the transmission of the first downlink reference signal resource but not QCL with the transmission of the second downlink reference signal resource.

According to another aspect, the method may include receiving, from a network node, an indication of a QCL configuration of the first and second downlink reference signal resources. Further, the step of determining that the transmission on the uplink reference signal resource will be QCL with the transmission of the first downlink reference signal resource but not QCL with the transmission of the second downlink reference signal resource may be based on the received QCL configuration.

According to another aspect, the indication of the QCL configuration of the first and second downlink reference signal resources may be associated with a configuration of reference signal measurement resources.

According to another aspect, the method may include performing the channel measurements on the first and second downlink reference signal resources.

According to another aspect, the QCL may be a spatial QCL.

According to another aspect, the QCL may be a reciprocal QCL.

According to another aspect, the step of determining the uplink precoder may include autonomously determining the uplink precoder based on the channel measurements on the first and second downlink reference signal resources.

According to another aspect, the first and second downlink reference signal resources may be associated with channel state information reference signals (CSI-RS).

According to another aspect, the method may include receiving, from a network node, an indication that the first downlink reference signal is associated with that network node.

According to another aspect, the method may include determining to reduce a power level of a transmission on an uplink channel that is reciprocally associated with the second downlink reference signal resource responsive to determining that a transmission on the first downlink reference signal resource is not QCL with a transmission on the second downlink reference signal resource. Further, the method may include transmitting on the uplink channel that is reciprocally associated with the second downlink reference signal resource at the reduced power level.

According to another aspect, the method may include determining to increase a power level of a transmission on an uplink channel that is reciprocally associated with the second downlink reference signal resource responsive to determining that a transmission on the first downlink reference signal resource is QCL with a transmission on the second downlink reference signal resource. Further, the method may include transmitting on the uplink channel that is reciprocally associated with the second downlink reference signal resource at the increased power level.

According to another aspect, the method may include estimating first and second downlink channels ($H_{DL}^{(1)}$ and $H_{DL}^{(2)}$, respectively) based on the channel measurements of the respective first and second downlink reference signal resources. Further, the step of determining the uplink precoder may be based on the first and second downlink channels.

According to another aspect, the step of determining the uplink precoder may be based on the following equation:

$$W_{UL} = \beta H_{DL}^{(1)H}(H_{DL}^{(2)}H_{DL}^{(2)H}+\lambda I)^{-1},$$

where:
$W_{UL}$ indicates the uplink precoder;
$\beta$ and $\lambda$ are scaling factors;
$H_{DL}^{(1)}$ and $H_{DL}^{(2)}$ indicates respective first and second estimated downlink channels;
$(\ )^H$ indicates a Hermitian matrix; and
I indicates an identity matrix.

According to another aspect, the QCL may be associated with a transmission on an uplink reference signal resource that is towards a transmission on a downlink reference signal resource.

According to another aspect, the transmission on the first downlink reference signal resource and the transmission on the second downlink reference signal resource may be from different network nodes.

According to another aspect, the transmission on the first downlink reference signal resource and the transmission on the second downlink reference signal resource may be from different sectors of the same network node.

According to another aspect, the transmission on the first downlink reference signal resource and the transmission on the second downlink reference signal resource may be from different antenna ports of the same sector of the same network node.

According to one aspect, a wireless device is configured to determine an uplink precoder based on channel measurements on first and second downlink reference signal resources. Further, the precoder enables a transmission on an uplink reference signal resource that is precoded with the uplink precoder and that is quasi QCL with a transmission on the first downlink reference signal resource but not QCL with a transmission on the second downlink reference signal resource.

According to another aspect, the wireless device may be configured to transmit an uplink reference signal on an uplink reference signal resource. Further, the uplink reference signal may be precoded with the uplink precoder so that the transmission on the uplink reference signal resource is QCL with the transmission on the first downlink reference signal resource but not QCL with the transmission on the second downlink reference signal resource.

According to another aspect, the wireless device may be configured to determine that the transmission on the uplink reference signal resource will be QCL with the transmission of the first downlink reference signal resource but not QCL with the transmission of the second downlink reference signal resource.

According to another aspect, the wireless device may be configured to receive, from a network node, an indication of a QCL configuration of the first and second downlink reference signal resources. Further, the step of determining that the transmission on the uplink reference signal resource will be QCL with the transmission of the first downlink reference signal resource but not QCL with the transmission of the second downlink reference signal resource may be based on the received QCL configuration.

According to another aspect, the wireless device may be configured to perform the channel measurements on the first and second downlink reference signal resources.

According to another aspect, the wireless device may be configured to receive, from a network node, an indication that the first downlink reference signal is associated with that network node.

According to another aspect, the wireless device may be configured to determine to reduce a power level of a transmission on an uplink channel that is reciprocally associated with the second downlink reference signal resource responsive to determining that a transmission on the first downlink reference signal resource is not QCL with a transmission on the second downlink reference signal resource. Further, the wireless device may be configured to transmit on the uplink channel that is reciprocally associated with the second downlink reference signal resource at the reduced power level.

According to another aspect, the wireless device may be configured to determine to increase a power level of a transmission on an uplink channel that is reciprocally associated with the second downlink reference signal resource responsive to determining that a transmission on the first downlink reference signal resource is QCL with a transmission on the second downlink reference signal resource. Further, the wireless device may be configured to transmit on the uplink channel that is reciprocally associated with the second downlink reference signal resource at the increased power level.

According to another aspect, the wireless device may be configured to estimate first and second downlink channels ($H_{DL}^{(1)}$ and $H_{DL}^{(2)}$, respectively) based on the channel measurements of the respective first and second downlink reference signal resources. Further, the wireless device may be configured to determine the uplink precoder based on the first and second downlink channels.

According to one aspect, a wireless device a wireless device comprises at least one processor and a memory. Further, the memory comprises instructions, executable by the at least one processor, whereby the wireless device is configured to determine an uplink precoder based on channel measurements on first and second downlink reference signal resources. Further, the precoder enables a transmission on an uplink reference signal resource that is precoded with the uplink precoder and that is QCL with a transmission on the first downlink reference signal resource but not QCL with a transmission on the second downlink reference signal resource.

According to another aspect, the memory may include instructions whereby the wireless device is configured to transmit an uplink reference signal on an uplink reference signal resource. Further, the uplink reference signal may be precoded with the uplink precoder so that the transmission on the uplink reference signal resource is QCL with the transmission on the first downlink reference signal resource but not QCL with the transmission on the second downlink reference signal resource.

According to another aspect, the memory may include instructions whereby the wireless device is configured to determine that the transmission on the uplink reference signal resource will be QCL with the transmission of the first downlink reference signal resource but not QCL with the transmission of the second downlink reference signal resource.

According to another aspect, the memory may include instructions whereby the wireless device is configured to receive, from a network node, an indication of a QCL configuration of the first and second downlink reference signal resources. Further, the memory may include instructions whereby the wireless device is configured to determine that the transmission on the uplink reference signal resource will be QCL with the transmission of the first downlink reference signal resource but not QCL with the transmission of the second downlink reference signal resource may be based on the received QCL configuration.

According to another aspect, the memory may include instructions whereby the wireless device is configured to perform the channel measurements on the first and second downlink reference signal resources.

According to another aspect, the memory may include instructions whereby the wireless device is configured to receive, from a network node, an indication that the first downlink reference signal is associated with that network node.

According to another aspect, the memory may include instructions whereby the wireless device is configured to determine to reduce a power level of a transmission on an uplink channel that is reciprocally associated with the second downlink reference signal resource responsive to determining that a transmission on the first downlink reference signal resource is not QCL with a transmission on the second downlink reference signal resource. Further, the memory may include instructions whereby the wireless device is configured to transmit on the uplink channel that is reciprocally associated with the second downlink reference signal resource at the reduced power level.

According to another aspect, the memory may include instructions whereby the wireless device is configured to determine to increase a power level of a transmission on an uplink channel that is reciprocally associated with the second downlink reference signal resource responsive to determining that a transmission on the first downlink reference signal resource is QCL with a transmission on the second downlink reference signal resource. Further, the memory may include instructions whereby the wireless device is configured to transmit on the uplink channel that is reciprocally associated with the second downlink reference signal resource at the increased power level.

According to another aspect, the memory may include instructions whereby the wireless device is configured to estimate first and second downlink channels ($H_{DL}^{(1)}$ and $H_{DL}^{(2)}$, respectively) based on the channel measurements of the respective first and second downlink reference signal resources. Further, the memory may include instructions whereby the wireless device is configured to determine the uplink precoder based on the first and second downlink channels.

According to one aspect, a wireless device comprises an uplink precoder determining module for determining an uplink precoder based on channel measurements on first and second downlink reference signal resources. Further, the precoder enables a transmission on an uplink reference signal resource that is precoded with the uplink precoder and that is quasi co-located (QCL) with a transmission on the first downlink reference signal resource but not QCL with a transmission on the second downlink reference signal resource.

According to another aspect, the wireless device may include a transmitting module for transmitting an uplink reference signal on an uplink reference signal resource. Further, the uplink reference signal may be precoded with the uplink precoder so that the transmission on the uplink reference signal resource is QCL with the transmission on the first downlink reference signal resource but not QCL with the transmission on the second downlink reference signal resource.

According to another aspect, the wireless device may include a QCL determining module for determining that the transmission on the uplink reference signal resource will be QCL with the transmission of the first downlink reference signal resource but not QCL with the transmission of the second downlink reference signal resource.

According to another aspect, the wireless device may include a receiving module for receiving, from a network node, an indication of a QCL configuration of the first and second downlink reference signal resources. Further, the QCL determining module may include determining that the transmission on the uplink reference signal resource will be QCL with the transmission of the first downlink reference signal resource but not QCL with the transmission of the second downlink reference signal resource based on the received QCL configuration.

According to another aspect, the wireless device may include a downlink channel measurement performing module for performing the channel measurements on the first and second downlink reference signal resources.

According to another aspect, the wireless device may include a receiving module for receiving, from a network node, an indication that the first downlink reference signal is associated with that network node.

According to another aspect, the wireless device may include an uplink power level determining module for determining to reduce a power level of a transmission on an uplink channel that is reciprocally associated with the second downlink reference signal resource responsive to determining that a transmission on the first downlink reference signal resource is not QCL with a transmission on the second downlink reference signal resource. Further, the wireless device may include a transmitting module for transmitting on the uplink channel that is reciprocally associated with the second downlink reference signal resource at the reduced power level.

According to another aspect, the wireless device may include an uplink power level determining module for determining to increase a power level of a transmission on an uplink channel that is reciprocally associated with the second downlink reference signal resource responsive to determining that a transmission on the first downlink reference signal resource is QCL with a transmission on the second downlink reference signal resource. Further, the wireless device may include a transmitting module for transmitting on the uplink channel that is reciprocally associated with the second downlink reference signal resource at the increased power level.

According to another aspect, the wireless device may include a downlink channel estimating module for estimating first and second downlink channels ($H_{DL}^{(1)}$ and $H_{DL}^{(2)}$, respectively) based on the channel measurements of the respective first and second downlink reference signal resources. Further, the uplink precoder determining module may include determining the uplink precoder based on the first and second downlink channels.

According to one aspect, a computer program, comprising instructions which, when executed on at least one processor of a wireless device, cause the at least one processor to carry out any of the methods describes herein. Further, a carrier may contain the computer program with the carrier being one of an electronic signal, optical signal, radio signal, or computer readable storage medium.

According to one aspect, a method by a network node comprises determining that a transmission on an uplink reference signal resource will be QCL with a transmission on a first downlink reference signal resource but not QCL with a transmission on a second downlink reference signal resource. Further, the method includes transmitting, to a wireless device, an indication that a transmission on the uplink reference signal resource will be QCL with a transmission on the first downlink reference signal resource but not QCL with a transmission of the second downlink reference signal resource.

According to another aspect, the indication that the transmission on the uplink reference signal resource will be QCL with a transmission on the first downlink reference signal resource but not QCL with a transmission of the second downlink reference signal resource may be associated with a configuration of reference signal measurement resources.

According to another aspect, the method may include transmitting one or more downlink reference signals on at least one of the first and second downlink reference signal resources so that the wireless device performs channel measurements on the one or more downlink reference signals on the first and second downlink reference signal resources to determine a precoder that enables a transmission on an uplink reference signal resource that is precoded with the uplink precoder and that is QCL with a transmission on the first downlink reference signal resource but not QCL with a transmission on the second downlink reference signal resource.

According to another aspect, the method may include transmitting, to the wireless device, an indication that the first downlink reference signal is associated with the network node.

According to another aspect, the method may include receiving an uplink reference signal transmitted on the uplink reference signal resource. Further, the uplink reference signal may be precoded with a precoder that is QCL with the transmission on the first downlink reference signal resource but not QCL with the transmission on the second downlink reference signal resource.

According to another aspect, the first and second downlink reference signal resources may be associated with CSI-RS signals.

According to another aspect, the QCL may be a spatial QCL.

According to another aspect, the QCL may be a reciprocal QCL.

According to one aspect, a network node is configured to determine that a transmission on an uplink reference signal resource will be QCL with a transmission on a first downlink reference signal resource but not QCL with a transmission on a second downlink reference signal resource. Further, the network node is configured to transmit, to a wireless device, an indication that a transmission on the uplink reference signal resource will be QCL with a transmission on the first downlink reference signal resource but not QCL with a transmission of the second downlink reference signal resource.

According to another aspect, the network node may be configured to transmit one or more downlink reference signals on at least one of the first and second downlink reference signal resources so that the wireless device can perform channel measurements on the one or more downlink reference signals on the first and second downlink reference signal resources to determine a precoder that enables a transmission on an uplink reference signal resource that is precoded with the uplink precoder and that is QCL with a transmission on the first downlink reference signal resource but not QCL with a transmission on the second downlink reference signal resource.

According to another aspect, the network node may be configured to transmit, to the wireless device, an indication that the first downlink reference signal is associated with the network node.

According to another aspect, the network node may be configured to receive an uplink reference signal transmitted on the uplink reference signal resource. Further, the uplink reference signal may be precoded with a precoder that is QCL with the transmission on the first downlink reference signal resource but not QCL with the transmission on the second downlink reference signal resource.

According to one aspect, a network node comprises at least one processor and a memory. Further, the memory comprises instructions, executable by the processor, whereby the network node is configured to determine that a transmission on an uplink reference signal resource will be QCL with a transmission on a first downlink reference signal resource but not QCL with a transmission on a second downlink reference signal resource. Also, the memory comprises instructions whereby the wireless device is configured to transmit, to a wireless device, an indication that a transmission on the uplink reference signal resource will be QCL with a transmission on the first downlink reference signal resource but not QCL with a transmission of the second downlink reference signal resource.

According to another aspect, the memory may include instructions whereby the network node is configured to transmit one or more downlink reference signals on at least one of the first and second downlink reference signal resources so that the wireless device can perform channel measurements on the one or more downlink reference signals on the first and second downlink reference signal resources to determine a precoder that enables a transmission on an uplink reference signal resource that is precoded with the uplink precoder and that is QCL with a transmission on the first downlink reference signal resource but not QCL with a transmission on the second downlink reference signal resource.

According to another aspect, the memory may include instructions whereby the network node is configured to transmit, to the wireless device, an indication that the first downlink reference signal is associated with the network node.

According to another aspect, the memory may include instructions whereby the network node is configured to receive an uplink reference signal transmitted on the uplink reference signal resource. Further, the uplink reference signal may be precoded with a precoder that is QCL with the transmission on the first downlink reference signal resource but not QCL with the transmission on the second downlink reference signal resource.

According to one aspect, a network node comprises an uplink transmission determining module for determining that a transmission on an uplink reference signal resource will be QCL with a transmission on a first downlink reference signal resource but not QCL with a transmission on a second downlink reference signal resource. Further, the network node includes a transmitting module for transmitting, to a wireless device, an indication that a transmission on the uplink reference signal resource will be QCL with a transmission on the first downlink reference signal resource but not QCL with a transmission of the second downlink reference signal resource.

According to another aspect, the transmitting module may include transmitting one or more downlink reference signals on at least one of the first and second downlink reference signal resources so that the wireless device can perform channel measurements on the one or more downlink reference signals on the first and second downlink reference signal resources to determine a precoder that enables a transmission on an uplink reference signal resource that is precoded with the uplink precoder and that is QCL with a transmission on the first downlink reference signal resource but not QCL with a transmission on the second downlink reference signal resource.

According to another aspect, the transmitting module may include transmitting, to the wireless device, an indication that the first downlink reference signal is associated with the network node.

According to another aspect, the network node may include a receiving module for receiving an uplink reference signal transmitted on the uplink reference signal resource. Further, the uplink reference signal may be precoded with a precoder that is QCL with the transmission on the first downlink reference signal resource but not QCL with the transmission on the second downlink reference signal resource.

According to one aspect, a computer program, comprising instructions which, when executed on at least one processor of a network node, cause the at least one processor to carry out any of the methods described herein. Further, a carrier may contain the computer program with the carrier being one of an electronic signal, optical signal, radio signal, or computer readable storage medium.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1:
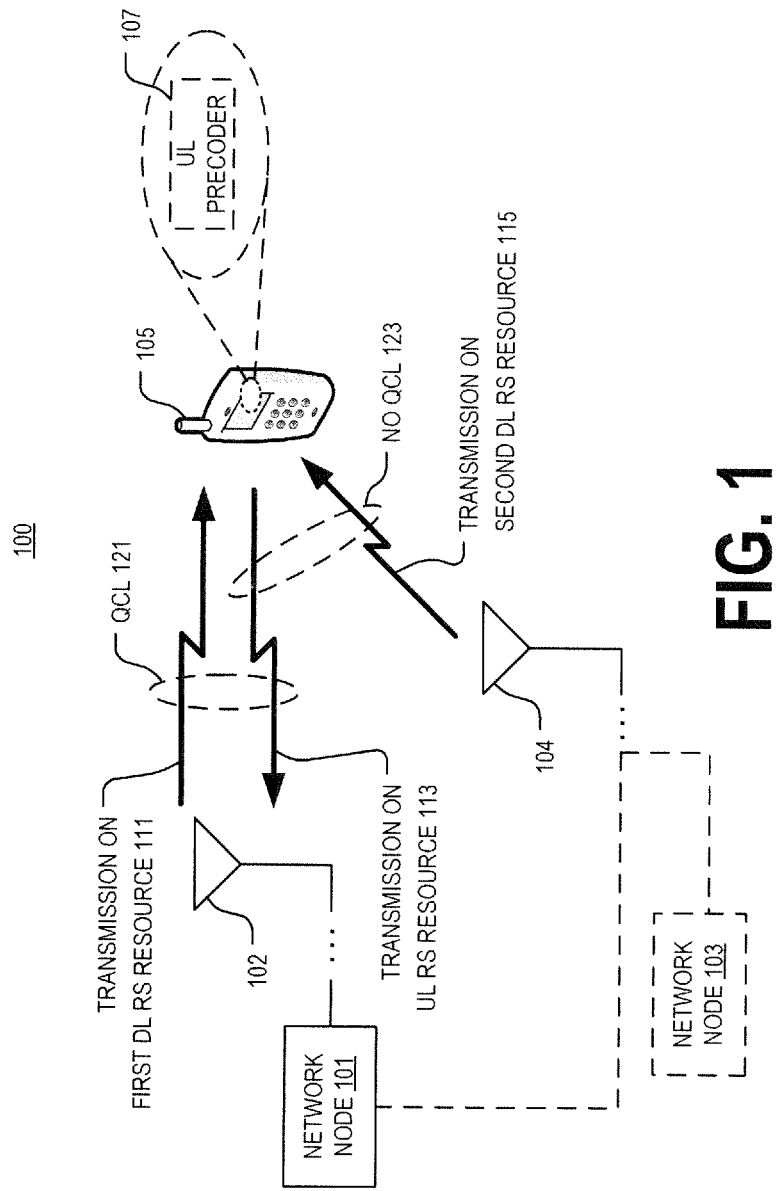
FIG. 1 illustrates one embodiment of a system for reducing interference in a wireless communication system in accordance with various aspects as described herein.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

In LTE, the concept of QCL has been introduced in order to improve the channel estimation performance when demodulating control or data channels. This concept requires the UE to estimate long term channel properties from one reference signal in order to tune its channel estimation algorithm. For instance, the average channel delay spread may be estimated using one antenna port and used when demodulating a data channel transmitted using another antenna port. If this is allowed, it is specified that the first and second antenna port are QCL with respect to an average channel delay spread. Hence, as used in LTE, two antenna ports may be QCL if the large-scale channel properties of the channel over which a symbol on one antenna port is conveyed may be inferred from the channel over which a symbol on the other antenna port is conveyed. The large-scale channel properties include one or more of delay spread, Doppler spread, Doppler shift, average gain, and average delay. In addition or alternatively, the large-scale channel properties may include one or more of received power for each antenna port, received timing (i.e., timing of a first significant channel tap), a number of significant channel taps, and frequency shift. By performing a channel estimation algorithm tuning based on the reference signals corresponding to the QCL antenna ports, a quality of the channel estimation is substantially improved.

In NR, the QCL framework with all definitions are inherited and extended to support UE beamforming by introducing spatial QCL. First, one or more spatial parameters for QCL in NR describes the spatial channel properties of the RS antenna ports observed at the receiver. Second, for downlink, NR supports channel state information reference signal (CSI-RS) reception with and without beam-related indication. For instance, when a beam-related indication is provided, information pertaining to UE-side beamforming/receiving procedure used for CSI-RS-based measurement may be indicated through QCL to UE. Further, QCL information includes one or more spatial parameters for UE side reception of CSI-RS ports. This means that the gNB (e.g., NR base station) may indicate to the UE that a first reference signal (e.g., CSI-RS) is spatially QCL at the receiver with a second reference signal (e.g., DMRS), which means that the UE may use the same UE receive beam to receive the PDSCH (second reference signal) as it previously used to receive the CSI-RS (first reference signal).

The receive node determines an identification that the second reference signal is QCL with the first reference signal, with respect to spatial channel correlation parameters that include a subset or linear combinations thereof. This implies that the receive node may assume that the beam-weight dependent metric that is a function of the channel correlation parameters is the same between the first and second reference signals, and that the receive node may reuse the optimized receive beam weights for the reception of the second reference signal as was used for receiving the first reference signal, without having to resort to a new receiver beam sweep.

This disclosure includes describing systems and methods for reducing interference in a wireless communication system using the concept of QCL. Such systems and methods include the use of QCL to allow for a wireless device (e.g., UE) to transmit an uplink signal to a desired network node (e.g., serving base station) while reducing interference caused by this transmission to other network nodes (e.g., other base stations). Accordingly, advantages of this solution include reducing uplink interference in a wireless communication system where a wireless device (e.g., UE) autonomously determines an uplink precoder. For example, FIG. 1 illustrates one embodiment of a system 100 for reducing interference in a wireless communication system in accordance with various aspects as described herein. The system 100 may comprise a first network node 101, a second network node 103, and a wireless device 105. In FIG. 1, the first network node 101 (e.g., base station) may determine that, for the wireless device 105 (e.g., UE), a transmission on an uplink reference signal (RS) resource 113 will be quasi co-located (QCL) 121 with a transmission on a first downlink RS resource 111 but not QCL 123 with a transmission of a second downlink RS resource 113. QCL may also be referred to as spatial QCL, reciprocal QCL, or the like. Further, QCL may be associated with a transmission on an uplink RS resource that is towards (i.e., directionally) a transmission on a downlink RS resource.

In FIG. 1, the network node 101 may transmit, to the wireless device 105, an indication that a transmission on the uplink RS resource 113 will be QCL 121 with a transmission on the first downlink RS resource 111 but not QCL 123 with a transmission on the second downlink RS resource 113. In addition, the network node 101 may transmit, from an antenna port 102, a first downlink RS on the first downlink RS resource 111. Further, the network node 101 may transmit, from another antenna port 104 (e.g., same or different sector or antenna array), a second downlink RS on the second downlink RS resource 115. Alternatively, another network node 103 may transmit, from antenna port 104, the second downlink RS on the second downlink RS resource 115. To clarify, the antenna ports 102 and 104 may correspond to the same antenna array of the network node 101, different antenna arrays or sectors of the network node 101, different network nodes 101, 103, or the like.

In this embodiment, the wireless device 105 may receive, from the network node 101, the indication and may determine that a transmission on the uplink RS resource 113 will be QCL 121 with a transmission on the first downlink RS resource 111 but not QCL 123 with a transmission on the second downlink RS resource 113. Further, the wireless device 105 may perform channel measurements on the transmissions of the first and second downlink RS resources 111, 113 and may estimate first and second downlink channels based on these channel measurements 111, 113. The wireless device 105 may also determine an uplink precoder 107 based on the channel measurements, the estimated downlink channels, or the like. In one example, the wireless device 105 may determine the uplink precoder 107 based on the estimated downlink channels. In another example, the uplink precoder 107 may be based on the following equation:

$$W_{UL}=\beta H_{DL}^{(1)H}(H_{DL}^{(2)}H_{DL}^{(2)H}+\lambda I)^{-1},$$

where $W_{UL}$ indicates the uplink precoder 107, $\beta$ and $\lambda$ are scaling factors, $H_{DL}^{(1)}$ and $H_{DL}^{(2)}$ indicates respective first and second estimated downlink channels, $(\ )^H$ indicates a Hermitian matrix, and I indicates an identity matrix.

In FIG. 1, the uplink precoder 107 may enable a transmission of a reference signal on the uplink RS resource 113. An uplink RS may be precoded by the uplink precoder 107 to enable a transmission of the uplink RS on the uplink RS resource 113 so that this transmission 113 is QCL 121 with a transmission on the first downlink RS resource 111 but not QCL 123 with a transmission on the second downlink RS resource 115. Accordingly, the wireless device 105 may transmit the uplink RS on the uplink RS resource 113. The network node 101 may receive this transmission on the uplink RS resource 113.

Additionally or alternatively, a network node may be configured to support a wireless communication system (e.g., NR, LTE, LTE-NR, UMTS, GSM, or the like). Further, the network node may be a base station (e.g., eNB), an access point, a wireless router, or the like. The network node may serve wireless devices such as wireless device 105. The wireless device 105 may be configured to support a wireless communication system (e.g., NR, LTE, LTE-NR, UMTS, GSM, or the like). The wireless device 105 may be a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like.

Figure 2:
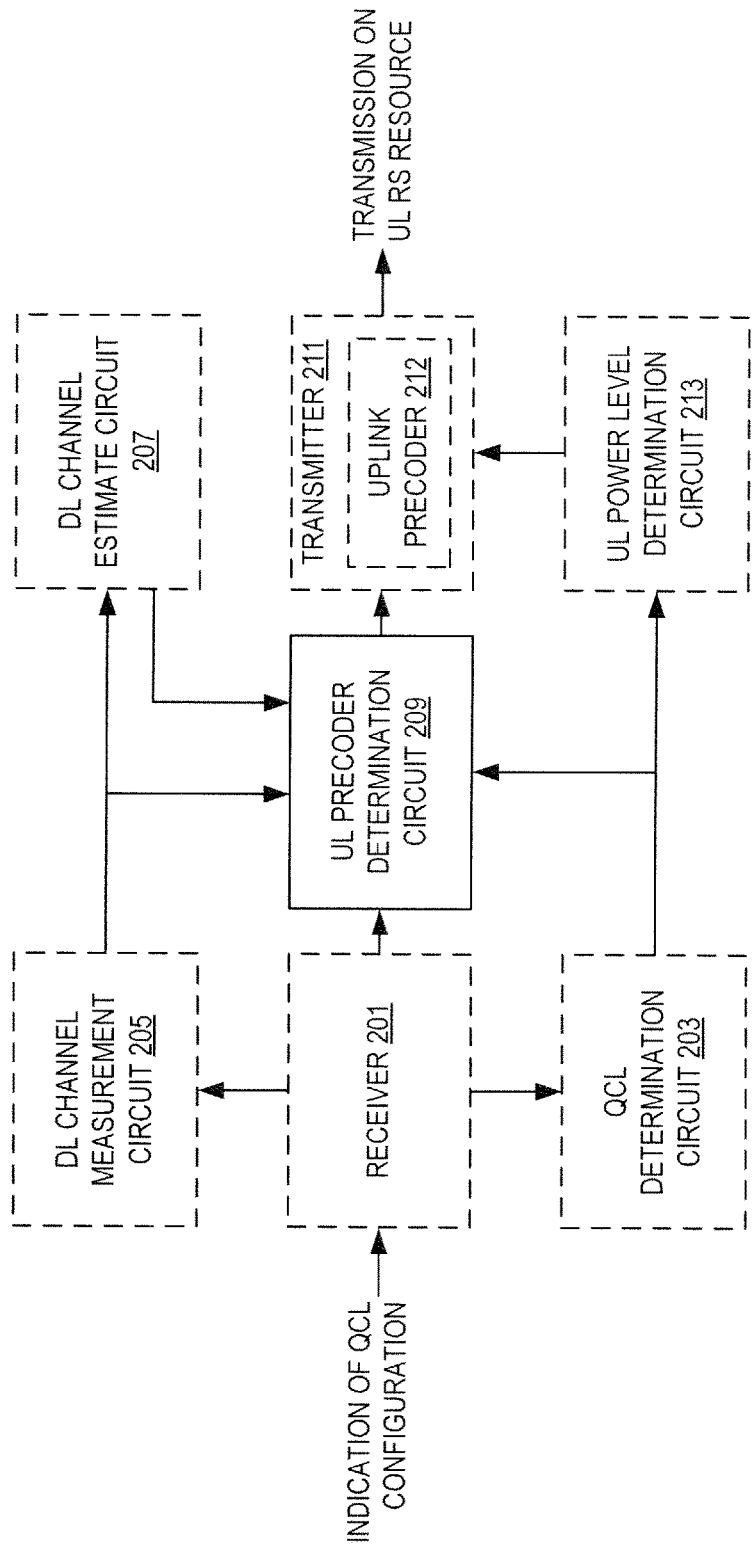
FIG. 2 illustrates one embodiment of a wireless device for reducing interference in a wireless communication system in accordance with various aspects as described herein.

FIG. 2 illustrates one embodiment of a wireless device 200 for reducing interference in a wireless communication system in accordance with various aspects as described herein. In FIG. 2, the wireless device 200 may include a receiver 201, a QCL configuration determination circuit 203, a downlink channel measurement circuit 205, a downlink channel estimate circuit 207, an uplink precoder determination circuit 209, a transmitter 211, an uplink power level determination circuit 213, the like, or any combination thereof. The receiver 201 may be configured to receive, from a network node, an indication of a QCL configuration of first and second downlink reference signal resources. Further, the receiver 201 may be configured to receive, from the network node, an indication that the first downlink reference signal is associated with that network node. The QCL configuration determination circuit 203 may be configured to determine that a transmission on an uplink reference signal resource will be QCL with a transmission on the first downlink reference signal resource but not QCL with a transmission on the second downlink reference signal resource. The downlink channel measurement circuit 205 may be configured to perform channel measurements on the first and second downlink reference signal resources. The downlink channel estimate circuit 207 may be configured to estimate first and second downlink channels based on the channel measurements of the respective first and second downlink reference signal resources.

In FIG. 2, the uplink precoder determination circuit 209 is configured to determine uplink precoder coefficients for an uplink precoder 212 based on channel measurements on the first and second downlink reference signal resources. The uplink precoder 212 may enable a transmission on an uplink reference signal resource that is precoded with the uplink precoder and that is QCL with a transmission on the first downlink reference signal resource but not QCL with a transmission on the second downlink reference signal resource. The transmitter 211 may be configured to transmit an uplink reference signal precoded by the uplink precoder 212 on the uplink reference signal resource. The uplink reference signal may be precoded with the uplink precoder 212 so that the transmission on the uplink reference signal resource is QCL with the transmission on the first downlink reference signal resource but not QCL with the transmission on the second downlink reference signal resource. The uplink power level determination circuit 213 may be configured to determine to increase or decrease a power level of a transmission on an uplink channel that is reciprocally associated with the second downlink reference signal resource responsive to determining that the transmission on the first downlink reference signal resource is not QCL with the transmission on the second downlink reference signal resource. Further, the transmitter 211 may be configured to transmit on the uplink channel that is reciprocally associated with the second downlink reference signal resource at the reduced power level.

Figure 3A:
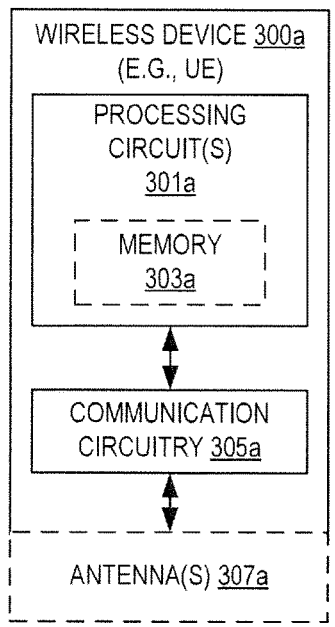
FIGS. 3A-B illustrate other embodiments of a wireless device in accordance with various aspects as described herein.
Figure 3B:
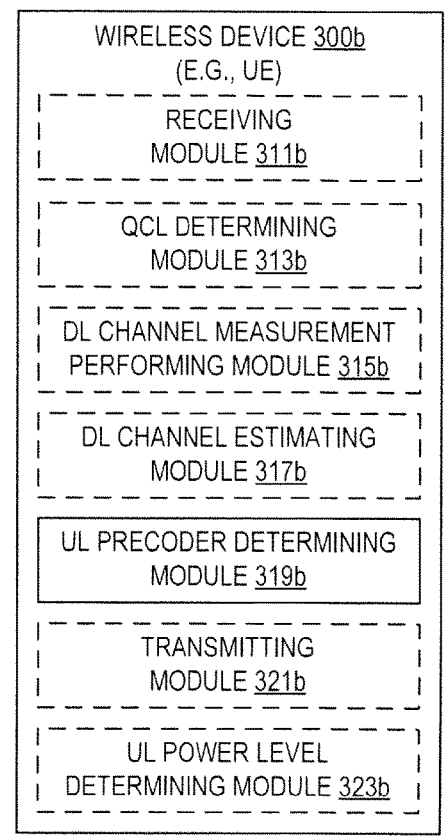

FIGS. 3A-B illustrate other embodiments of a wireless device 300a,b in accordance with various aspects as described herein. In FIG. 3A, the wireless device 300a (e.g., UE) may include processing circuit(s) 301a, radio frequency (RF) communications circuit(s) 305a, antenna(s) 307a, the like, or any combination thereof. The communication circuit(s) 305a may be configured to transmit or receive information to or from one or more network nodes via any communication technology. This communication may occur using the one or more antennas 307a that are either internal or external to the wireless device 300a. The processing circuit(s) 301a may be configured to perform processing as described herein (e.g., the methods of FIGS. 4 and 9) such as by executing program instructions stored in memory 303a. The processing circuit(s) 301a in this regard may implement certain functional means, units, or modules.

In FIG. 3B, the wireless device 300b may implement various functional means, units, or modules (e.g., via the processing circuit(s) 301a in FIG. 3A or via software code). These functional means, units, or modules (e.g., for implementing the methods of FIGS. 4 and 9) may include a receiving unit or module 311b for receiving, from a network node, an indication of a QCL configuration of first and second downlink reference signal resources. The receiving unit or module 311b may include receiving, from the network node, an indication that the first downlink reference signal is associated with that network node. Further, these functional means, units, or modules may include a QCL configuration determination unit or module 313b for determining that a transmission on an uplink reference signal resource will be QCL with a transmission on the first downlink reference signal resource but not QCL with a transmission on the second downlink reference signal resource. These functional means, units, or modules may include a downlink channel measuring unit or module 315b for performing channel measurements on the first and second downlink reference signal resources.

Furthermore, these functional means, units, or modules may include a downlink channel estimating unit or module 317b for estimating first and second downlink channels based on the channel measurements of the respective first and second downlink reference signal resources. In addition, these functional means, units, or modules include an uplink precoder determining unit or module 319b for determining an uplink precoder based on the channel measurements on the first and second downlink reference signal resources. The uplink precoder may enable a transmission on the uplink reference signal resource precoded with the uplink precoder that is QCL with a transmission on the first downlink reference signal resource but not QCL with a transmission on the second downlink reference signal resource. Additionally, these functional means, units, or modules may include a transmitting unit or module 321b for transmitting an uplink reference signal precoded by the uplink precoder on the uplink reference signal resource. The uplink reference signal may be precoded with the uplink precoder so that the transmission on the uplink reference signal resource is QCL with the transmission on the first downlink reference signal resource but not QCL with the transmission on the second downlink reference signal resource.

Moreover, these functional means, units, or modules may include an uplink power level determining module or unit 323b for determining to increase or decrease a power level of a transmission on an uplink channel that is reciprocally associated with the second downlink reference signal resource responsive to determining that the transmission on the first downlink reference signal resource is not QCL with the transmission on the second DL RS resource. Also, the transmitting module or unit 321b may include transmitting on the uplink channel that is reciprocally associated with the second downlink reference signal resource at the increased or decreased power level.

Figure 4:
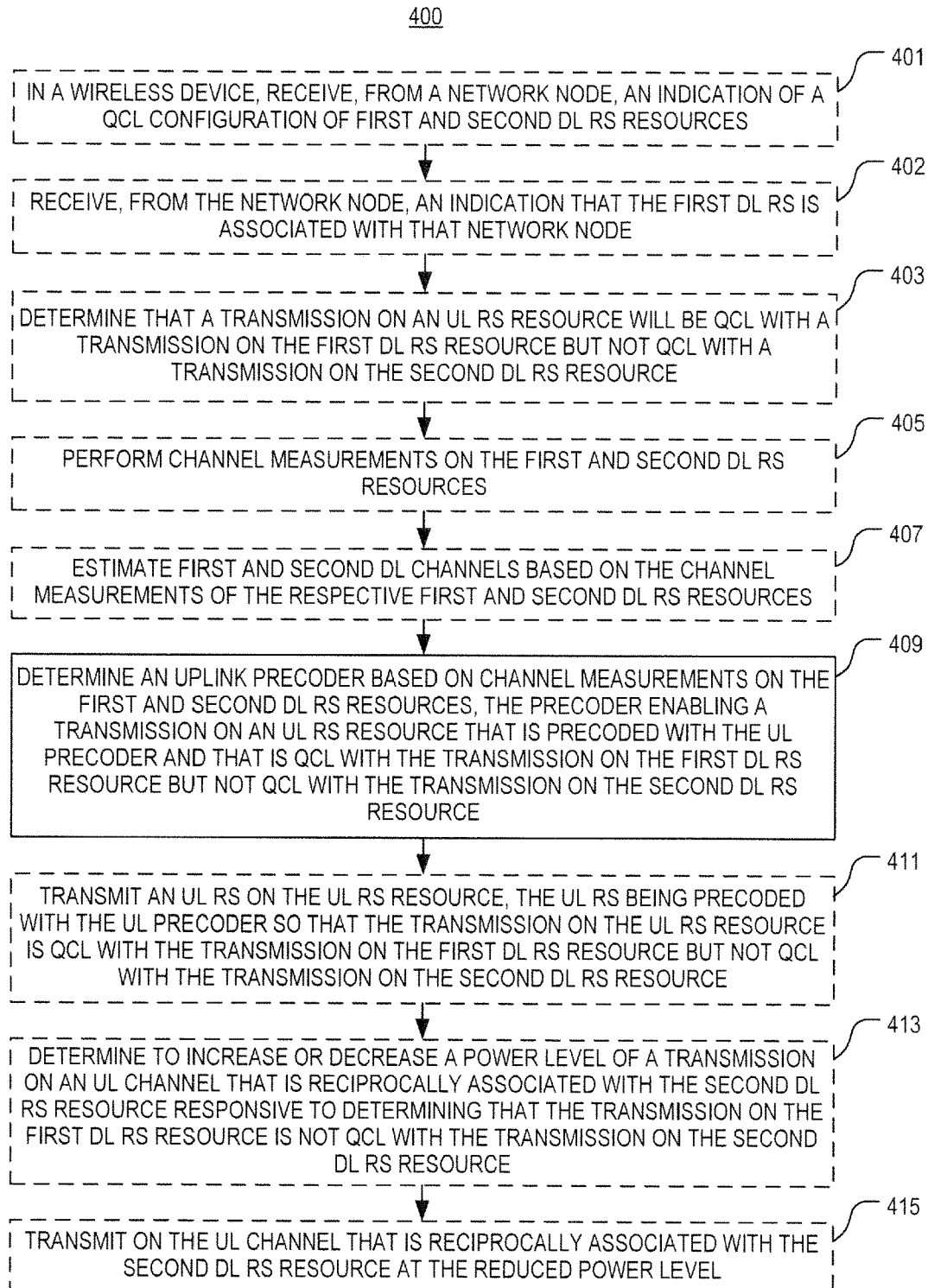
FIG. 4 illustrates one embodiment of a method by a wireless device for reducing interference in a wireless communication system in accordance with various aspects as described herein.

FIG. 4 illustrates one embodiment of a method 400 by a wireless device for reducing interference in a wireless communication system in accordance with various aspects as described herein. The wireless device performing this method 400 may correspond to any of the wireless devices 105, 200, 300a, 300b, 500, 1105, 1205, 1207 described herein. In FIG. 4, the method 400 may start, for instance, at block 401 where it may include receiving, from a network node, an indication of a QCL configuration of first and second downlink reference signal resources. At block 403, the method 400 may include determining that a transmission on an uplink reference signal resource will be QCL with a transmission on the first downlink reference signal resource but not QCL with a transmission on the second downlink reference signal resource. At block 405, the method 400 may include performing channel measurements on the first and second downlink reference signal resources.

In FIG. 4, at block 407, the method 400 may include estimating first and second downlink channels based on the channel measurements of the respective first and second downlink reference signal resources. At block 409, the method 400 includes determining an uplink precoder based on channel measurements on the first and second downlink reference signal resources. The uplink precoder may enable a transmission on an uplink reference signal resource that is precoded with the uplink precoder and that is QCL with a transmission on the first downlink reference signal resource but not QCL with a transmission on the second downlink reference signal resource. At block 411, the method 400 may include transmitting an uplink reference signal precoded by the uplink precoder on the uplink reference signal resource. The uplink reference signal may be precoded with the uplink precoder so that the transmission on the uplink reference signal resource is QCL with the transmission on the first downlink reference signal resource but not QCL with the transmission on the second downlink reference signal resource.

Figure 5:
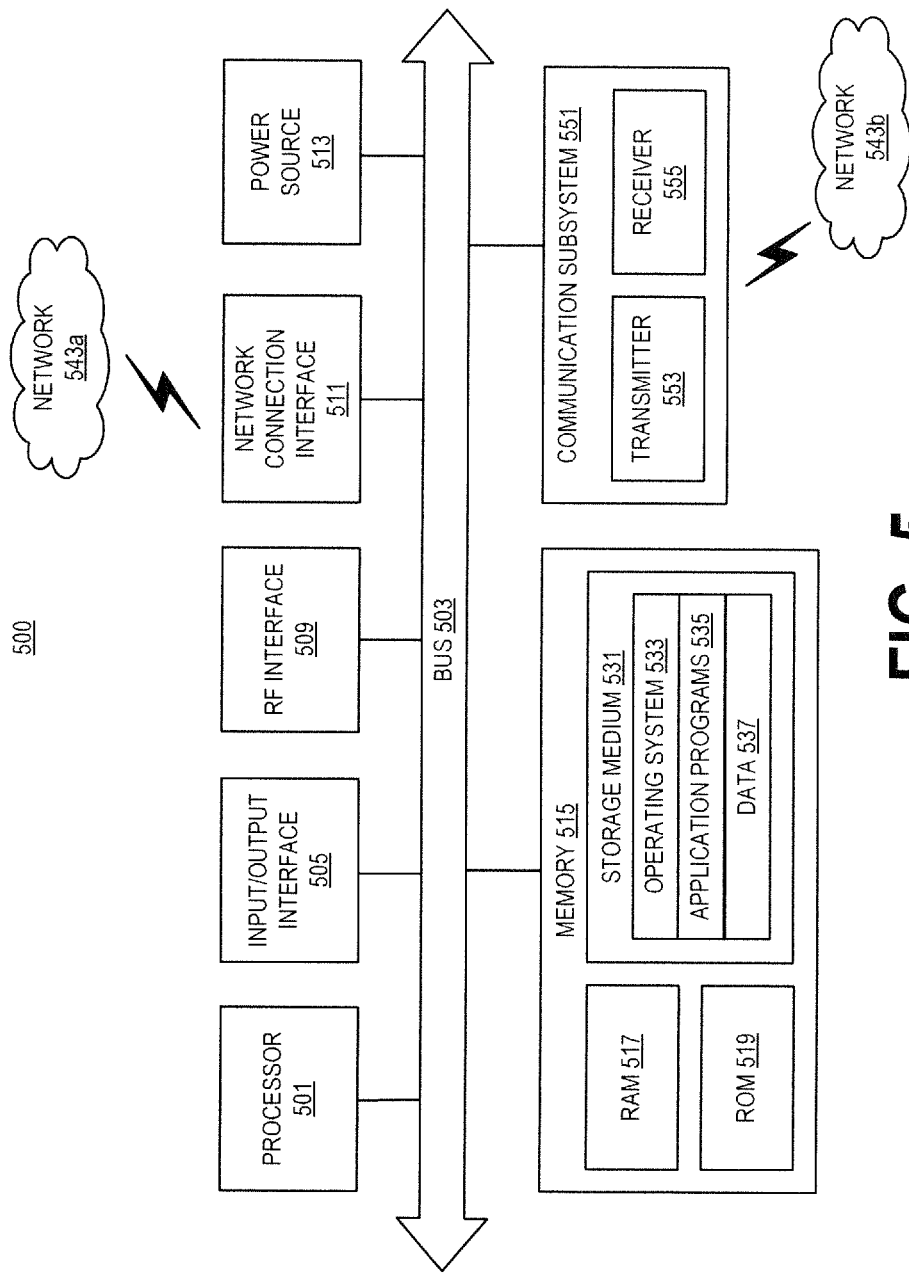
FIG. 5 illustrates another embodiment of a wireless device in accordance with various aspects as described herein.

FIG. 5 illustrates another embodiment of a wireless device in accordance with various aspects as described herein. In some instances, the wireless device 500 may be referred as a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 500 may be a set of hardware components. In FIG. 5, the wireless device 500 may be configured to include a processor 501 that is operatively coupled to an input/output interface 505, a radio frequency (RF) interface 509, a network connection interface 511, a memory 515 including a random access memory (RAM) 517, a read only memory (ROM) 519, a storage medium 531 or the like, a communication subsystem 551, a power source 533, another component, or any combination thereof. The storage medium 531 may include an operating system 533, an application program 535, data 537, or the like. Specific devices may utilize all of the components shown in FIG. 5, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 5, the processor 501 may be configured to process computer instructions and data. The processor 501 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 501 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 505 may be configured to provide a communication interface to an input device, output device, or input and output device. The wireless device 500 may be configured to use an output device via the input/output interface 505. A person of ordinary skill will recognize that an output device may use the same type of interface port as an input device. For example, a USB port may be used to provide input to and output from the wireless device 500. The output device may be a speaker, a sound card, a video card, a display, a monitor, a printer, an actuator, an emitter, a smartcard, another output device, or any combination thereof. The wireless device 500 may be configured to use an input device via the input/output interface 505 to allow a user to capture information into the wireless device 500. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, the RF interface 509 may be configured to provide a communication interface to RF components such as a transmitter, a receiver, and an antenna. The network connection interface 511 may be configured to provide a communication interface to a network 543a. The network 543a may encompass wired and wireless communication networks such as a local-area network (LAN), a wide-area network (WAN), a computer network, a wireless network, a telecommunications network, another like network or any combination thereof. For example, the network 543a may be a Wi-Fi network. The network connection interface 511 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 517 may be configured to interface via the bus 503 to the processor 501 to provide storage or caching of data or computer instructions during the execution of software programs such as the operating system, application programs, and device drivers. In one example, the wireless device 500 may include at least one hundred and twenty-eight megabytes (128 Mbytes) of RAM. The ROM 519 may be configured to provide computer instructions or data to the processor 501. For example, the ROM 519 may be configured to be invariant low-level system code or data for basic system functions such as basic input and output (I/O), startup, or reception of keystrokes from a keyboard that are stored in a non-volatile memory. The storage medium 531 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 531 may be configured to include an operating system 533, an application program 535 such as a web browser application, a widget or gadget engine or another application, and a data file 537.

In FIG. 5, the processor 501 may be configured to communicate with a network 543b using the communication subsystem 551. The network 543a and the network 543b may be the same network or networks or different network or networks. The communication subsystem 551 may be configured to include one or more transceivers used to communicate with the network 543b. The one or more transceivers may be used to communicate with one or more remote transceivers of another wireless device such as a base station of a radio access network (RAN) according to one or more communication protocols known in the art or that may be developed, such as IEEE 802.xx, CDMA, WCDMA, GSM, LTE, New Radio (NR), NB IoT, UTRAN, WiMax, or the like.

In another example, the communication subsystem 551 may be configured to include one or more transceivers used to communicate with one or more remote transceivers of another wireless device such as user equipment according to one or more communication protocols known in the art or that may be developed, such as IEEE 802.xx, CDMA, WCDMA, GSM, LTE, NR, NB IoT, UTRAN, WiMax, or the like. Each transceiver may include a transmitter 553 or a receiver 555 to implement transmitter or receiver functionality, respectively, appropriate to the RAN links (e.g., frequency allocations and the like). Further, the transmitter 553 and the receiver 555 of each transceiver may share circuit components, software, or firmware, or alternatively may be implemented separately.

In the current embodiment, the communication functions of the communication subsystem 551 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 551 may include cellular communication, Wi-Fi communication, Bluetooth communication, and GPS communication. The network 543b may encompass wired and wireless communication networks such as a local-area network (LAN), a wide-area network (WAN), a computer network, a wireless network, a telecommunications network, another like network or any combination thereof. For example, the network 543*b* may be a cellular network, a Wi-Fi network, and a near-field network. The power source 513 may be configured to provide an alternating current (AC) or direct current (DC) power to components of the wireless device 500.

In FIG. 5, the storage medium 531 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 531 may allow the wireless device 500 to access computer-executable instructions, application programs or the like, stored on transitory or non-transitory memory media, to off-load data, or to upload data. An article of manufacture, such as one utilizing a communication system may be tangibly embodied in storage medium 531, which may comprise a computer-readable medium.

The functionality of the methods described herein may be implemented in one of the components of the wireless device 500 or partitioned across multiple components of the wireless device 500. Further, the functionality of the methods described herein may be implemented in any combination of hardware, software, or firmware. In one example, the communication subsystem 551 may be configured to include any of the components described herein. Further, the processor 501 may be configured to communicate with any of such components over the bus 503. In another example, any of such components may be represented by program instructions stored in memory that when executed by the processor 501 performs the corresponding functions described herein. In another example, the functionality of any of such components may be partitioned between the processor 501 and the communication subsystem 551. In another example, the non-computative-intensive functions of any of such components may be implemented in software or firmware and the computative-intensive functions may be implemented in hardware.

Figure 6:
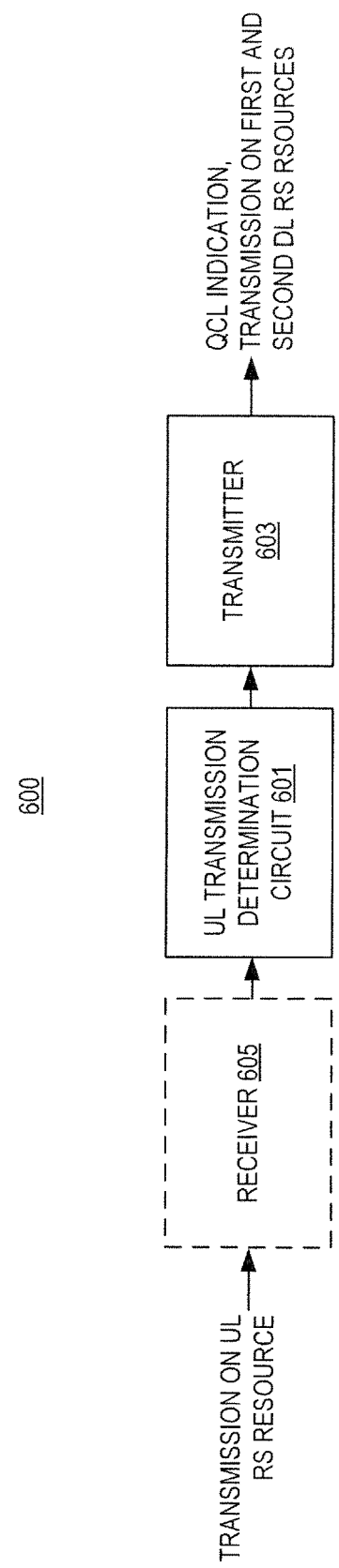
FIG. 6 illustrates one embodiment of a network node for reducing interference in a wireless communication system in accordance with various aspects as described herein.

FIG. 6 illustrates one embodiment of a network node 600 for reducing interference in a wireless communication system in accordance with various aspects as described herein. In FIG. 6, the network node 600 may include an uplink transmission determination circuit 601, a transmitter 603, a receiver 605, the like, or any combination thereof. The uplink transmission determination circuit 601 is configured to determine that a transmission on an uplink reference signal resource will be QCL with a transmission on a first downlink reference signal resource but not QCL with a transmission on a second downlink reference signal resource. The transmitter 603 is configured to transmit, to a wireless device, an indication that a transmission on the uplink reference signal resource will be QCL with a transmission on the first downlink reference signal resource but not QCL with a transmission of the second downlink reference signal resource. Moreover, the transmitter 603 may be configured to transmit one or more downlink reference signals on at least one of the first and second downlink reference signal resources so that the wireless device may perform channel measurements on the one or more downlink reference signals on the first and second downlink reference signal resources to determine a precoder that enables a transmission on an uplink reference signal resource that is precoded with the uplink precoder and that is QCL with a transmission on the first downlink reference signal resource but not QCL with a transmission on the second downlink reference signal resource. The receiver 605 may be configured to receive the transmission on the uplink reference signal resource that is QCL with the transmission on the first downlink reference signal resource but not QCL with the transmission on the second downlink reference signal resource.

Figure 7A:
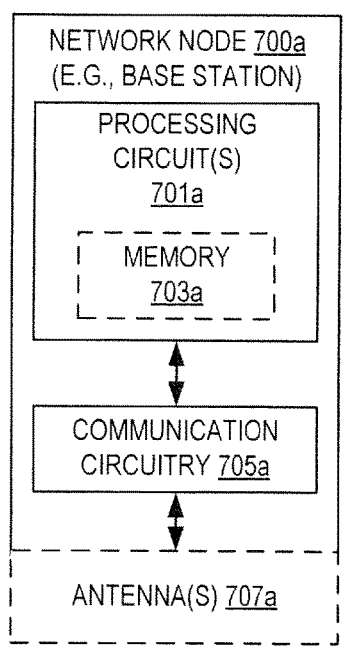
FIGS. 7A-B illustrate other embodiments of a network node in accordance with various aspects as described herein.
Figure 7B:
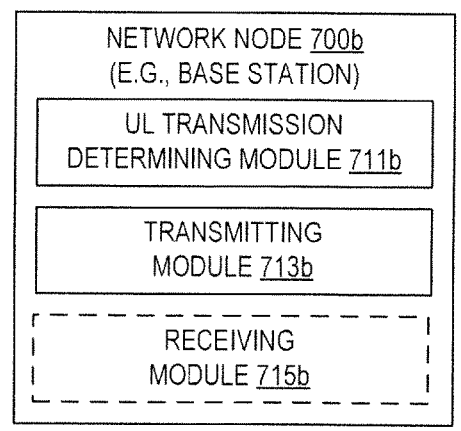

FIGS. 7A-B illustrate other embodiments of a network node 700*a,b* in accordance with various aspects as described herein. In FIG. 7A, the network node 700*a* (e.g., UE) may include processing circuit(s) 701*a*, radio frequency (RF) communications circuit(s) 705*a*, antenna(s) 707*a*, the like, or any combination thereof. The communication circuit(s) 705*a* may be configured to transmit or receive information to or from one or more base stations or one or more wireless devices via any communication technology. This communication may occur using the one or more antennas 707*a* that are either internal or external to the network node 700*a*. The processing circuit(s) 701*a* may be configured to perform processing as described herein (e.g., the methods of FIGS. 8 and 10) such as by executing program instructions stored in memory 703*a*. The processing circuit(s) 701*a* in this regard may implement certain functional means, units, or modules.

In FIG. 7B, the network node 700*b* may implement various functional means, units, or modules (e.g., via the processing circuit(s) 701*a* in FIG. 7A or via software code). These functional means, units, or modules (e.g., for implementing the methods of FIGS. 8 and 10) include an uplink transmission determination unit or module 711*b* for determining that a transmission on an uplink reference signal resource will be QCL with a transmission on a first downlink reference signal resource but not QCL with a transmission on a second downlink reference signal resource. Further, these functional means, units, or modules include a transmitting unit or module 713*b* for transmitting, to a wireless device, an indication that a transmission on the uplink reference signal resource will be QCL with a transmission on the first downlink reference signal resource but not QCL with a transmission of the second downlink reference signal resource. Moreover, the transmitting unit or module 713*b* may include transmitting one or more downlink reference signals on at least one of the first and second downlink reference signal resources so that the wireless device may perform channel measurements on the one or more downlink reference signals on at least one of the first and second downlink reference signal resources to determine a precoder that enables a transmission on an uplink reference signal resource that is precoded with the uplink precoder and that is QCL with a transmission on the first downlink reference signal resource but not QCL with a transmission on the second downlink reference signal resource. In addition, these functional means, units, or modules may include a receiving unit or module 715*b* for receiving a transmission on the uplink reference signal resource that is QCL with the transmission on the first downlink reference signal resource but not QCL with a transmission on the second downlink reference signal resource.

Figure 8:
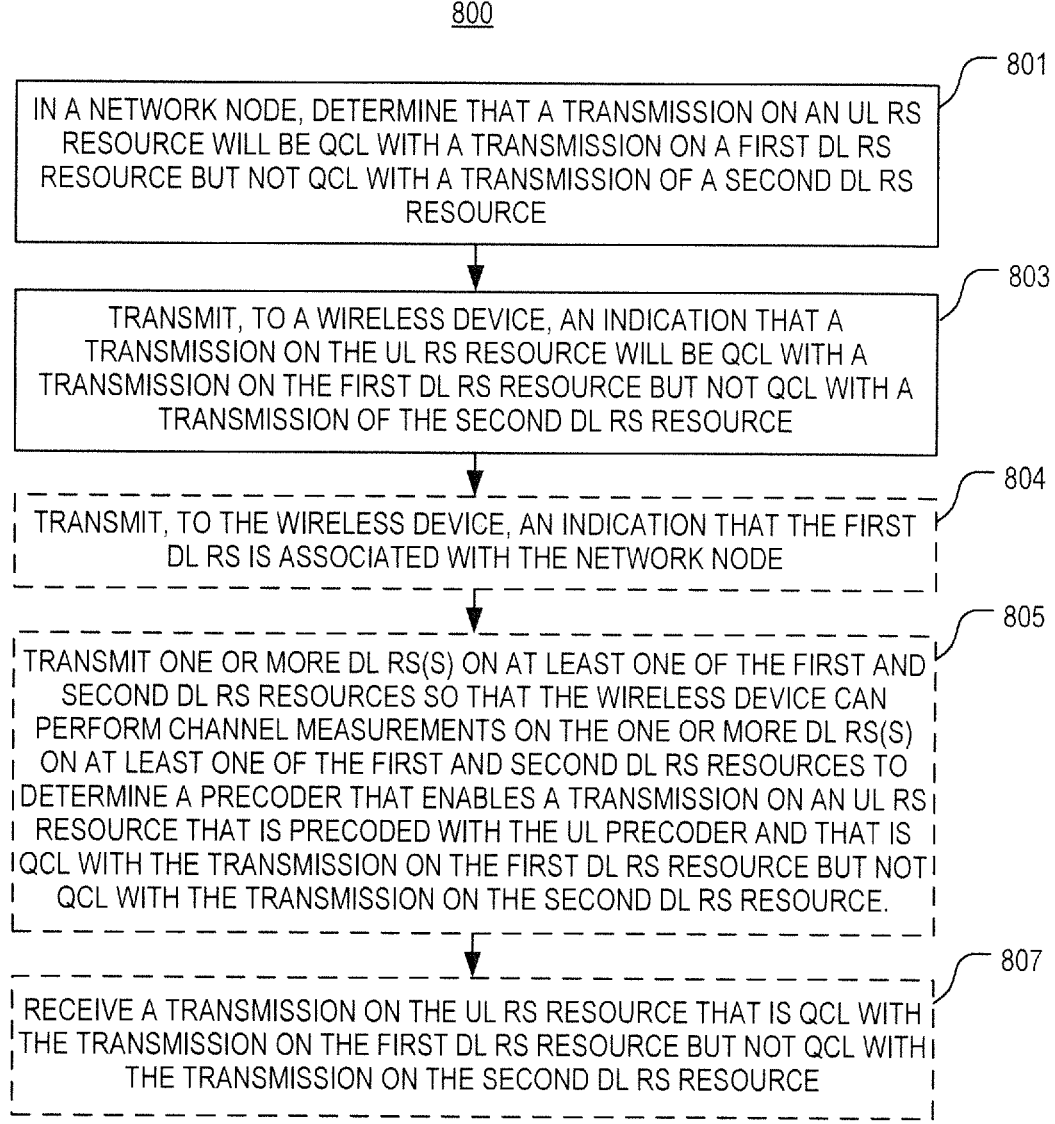
FIG. 8 illustrates one embodiment of a method by a network node of reducing interference in a wireless communication system in accordance with various aspects as described herein.

FIG. 8 illustrates one embodiment of a method 800 by a network node of reducing interference in a wireless communication system in accordance with various aspects as described herein. The network node performing this method 800 may correspond to any of the network nodes 101, 103, 600, 700a-b, 1101, 1103, 1201, 1203 described herein. In FIG. 8, the method 800 may start, for instance, at block 801 where it includes determining that a transmission on an uplink reference signal resource will be QCL with a transmission on a first downlink reference signal resource but not QCL with a transmission on a second downlink reference signal resource. At block 803, the method 800 includes transmitting, to a wireless device, an indication that a transmission on the uplink reference signal resource will be QCL with a transmission on the first downlink reference signal resource but not QCL with a transmission of the second downlink reference signal resource. At block 804, the method 800 may include transmitting, to the wireless device, an indication that the first downlink reference signal is associated with the network node. At block 805, the method 800 may include transmitting one or more downlink reference signals on at least one of the first and second downlink reference signal resources so that the wireless device may perform channel measurements on the one or more downlink reference signals on at least one of the first and second downlink reference signal resources to determine a precoder that enables a transmission on an uplink reference signal resource that is precoded with the uplink precoder and that is QCL with a transmission on the first downlink reference signal resource but not QCL with a transmission on the second downlink reference signal resource. At block 807, the method 800 may include receiving a transmission on the uplink reference signal resource that is QCL with the transmission on the first downlink reference signal resource but not QCL with the transmission on the second downlink reference signal resource.

Additional Disclosure:

Without loss of generality, the wireless device will be denoted in the following as user equipment (UE). One of the principles guiding the design of the NR system is transparency of the network to the UE. In other words, the UE is able to demodulate and decode its intended channels without specific knowledge of scheduling assignments for other UEs or network deployments.

For example, different DCI messages on Physical Downlink Control Channel (PDCCH) may be transmitted from antenna ports belonging to different transmission points. Even though there are several reasons for serving a UE with control signaling from different transmission points, one application relates to distributing parts of the scheduling algorithm at different transmission points, such that, e.g., DL transmissions are associated to a different transmission point than UL transmissions. In such a case, it makes sense to schedule DL and UL transmissions with control signaling provided directly from the respective transmission points.

A further application relates to serving a UE with parallel data transmissions from different transmission points, e.g., for increasing data rate or during handover between points. A further application relates to transmitting system control information from a "master" transmission point and relying on data transmission from other transmission points, typically associated to pico nodes.

In all the above applications, it makes sense to have the possibility to serve the UE with control signaling, e.g. on PDCCH, from different transmission points in the same subframe. In each case, UEs are not aware of the geographical location from which each antenna port is transmitted.

Demodulation reference signals (DMRS) or UE specific RS are employed for demodulation of data channels and possibly certain control channels (e.g. PDCCH). UE specific RS relieves the UE from having to know many of the properties of the transmission and thus allows flexible transmission schemes to be used from the network side. This is referred to as transmission transparency (with respect to the UE). A problem is however that the estimation accuracy of UE specific RS and thus of channel properties may not be good enough in some situations.

Geographical separation of RS ports implies that instantaneous channel coefficients from each port towards the UE are in general different. Furthermore, even the statistical properties of the channels for different antenna ports and RS types may be significantly different. Example of such statistical properties include the received power for each antenna port, the delay spread, the Doppler spread, the received timing (i.e., the timing of the first significant channel tap), the number of significant channel taps, the frequency shift. In LTE, nothing may be assumed about the properties of the channel corresponding to an antenna port based on the properties of the channel of another antenna port. This is in fact a key part of maintaining transmission transparency.

Based on the above observations, the UE needs to perform independent estimation for each antenna port of interest for each transmission. This results in occasionally inadequate channel estimation quality for certain antenna ports, leading to undesirable link and system performance degradation.

In LTE and NR, reference signals used for channel estimation may be associated with respective antenna ports. In one example, over one antenna port, a reference signal or set of references signals may be transmitted. From different antenna ports, different reference signals or different sets of reference signals may be sent, so that an antenna port may be distinguished from a further, different antenna port by means of the transmitted reference signals or sets of reference signals.

Hence, the UE may estimate the channel from one antenna port by using the associated reference signal (RS). One could then associate a certain data or control transmission with an antenna port, which is equivalent to say that the UE shall use the RS for that antenna port to estimate the channel used to demodulate the associated control or data channel. One could also say that the data or control channel is transmitted using that antenna port.

In LTE, the concept of quasi-co location has been introduced in order to improve the channel estimation performance when demodulating control or data channels. The concept relies on that the UE could estimate long term channel properties from one reference signal in order to tune its channel estimation algorithm. For instance, the average channel delay spread may be estimated using one antenna port and used when demodulating a data channel transmitted using another antenna port. If this is allowed, it is specified that the first and second antenna port are quasi co-located (QCL) w.r.t average channel delay spread.

Hence, as used in LTE specifications, two antenna ports may be "quasi co-located" if the large-scale channel properties of the channel over which a symbol on one antenna port is conveyed may be inferred from the channel over which a symbol on the other antenna port is conveyed. The large-scale channel properties preferably include one or more of delay spread, Doppler spread, Doppler shift, average gain, and average delay.

In addition, or alternatively, the large-scale channel properties may include one or more of received power for each antenna port, received timing (i.e., timing of a first significant channel tap), a number of significant channel taps, and frequency shift. By performing channel estimation algorithm tuning based on the RSs corresponding to the quasi co-located antenna ports, a quality of the channel estimation is substantially improved.

In NR, the QCL framework with all definitions are inherited and extended to support UE beamforming by introducing "spatial QCL" as follows:

Spatial parameter(s) for QCL in NR describes the spatial channel properties of the RS antenna ports observed at the receiver.

For downlink, NR supports CSI-RS reception with and without beam-related indication, When beam-related indication is provided, information pertaining to UE-side beamforming/receiving procedure used for CSI-RS-based measurement may be indicated through QCL to UE QCL information includes spatial parameter(s) for UE side reception of CSI-RS ports For Further Study (FFS): information other than QCL This means that the gNB may indicate to the UE that a first RS (e.g. the CSI-RS used for measurements) is spatially QCL at the receiver with a second RS (e.g. the DMRS used for PDSCH demodulation), which means that the UE may use the same UE RX beam to receive the PDSCH (second RS) as it previously used to receive the CSI-RS (first RS).

The RX node determines an identification that the second RS is QCL with the first RS, with respect to spatial channel correlation parameters, including a subset or linear combinations thereof. This implies that the RX node may assume that the beam-weight dependent metric, that is a function of the channel correlation parameters, are the same between the first RS and the second RS, and that the RX node may reuse the optimized receive beam weights for the reception of the second RS as was used for receiving the first RS, without having to resort to a new receiver beam sweep.

It is a problem with uplink interference in wireless communication systems where many terminals transmit uplink data at the same time and the network is dense (many gNB in a small area) so each uplink data transmission may be "heard" at not only the intended gNB but also at other gNBs, as interference.

Hence, it is thus a problem on how to reduce uplink interference in a wireless communication system when using precoded transmissions in the uplink based on channel reciprocity.

It is particularly a problem how to ensure that interference is kept low for UEs that are free to choose the precoder (i.e. a non-codebook based precoding approach) since the chosen precoder is not under network control.

In some embodiments, QCL, particularly spatial QCL, is used to ensure that the UE transmits an uplink signal that reaches the desired node but suppresses transmissions towards at least one node that may be interfered.

This disclosure further includes that uplink interference is reduced in a wireless communications network where the UE determines the precoder autonomously. A UE may be configured to measure CSI-RS from a CSI-RS resource and to transmit data in the uplink based on reciprocity. The UE measures the downlink channel $H_{DL}$ using CSI-RS and then calculates the precoder $W_{UL}$ taking into account $H_{DL}$, to use for the uplink data transmission. A simple reciprocity-based precoder that maximizes the received signal power in the uplink is as follows:

$$W_{UL} = \alpha H_{DL}^H,$$

where $(\ )^H$ indicates a Hermitian matrix and $\alpha$ is a scaling factor.

The UE is configured to measure on at least two CSI-RS resources in the downlink and to treat one CSI-RS resource as the desired resource and the other(s) as the interfering resource(s). Hence, at least two channels $H_{DL}^{(1)}$ and $H_{DL}^{(2)}$ are utilized when computing the uplink precoder. Further, the uplink precoder may ensure that uplink interference towards non-serving gNBs (interference in the downlink) is reduced, improving uplink capacity.

An example of such uplink precoder is:

$$W_{UL} = \beta H_{DL}^{(1)H}(H_{DL}^{(2)}H_{DL}^{(2)H} + \lambda I)^{-1},$$

This uplink precoder may be generalized to even more interfering CSI-RS resources or using downlink (DL) RS other than CSI-RS such as a mobility RS (MRS) or a synchronization sequence (SS).

Since NR supports uplink transmissions that do not use codebook-specified precoders, a codebook cannot be used to specify such interference suppression precoders. Instead, the behavior of the uplink transmissions must be captured. Using the spatial QCL framework, this behavior may include one or more of the following:

1. The UE transmitted UL-RS used for demodulating UL physical layer data channel(s) or UL physical layer control channel(s), or used for sounding or UL beam management, is spatially QCL with a received first DL RS resource while not spatially QCL with at least one received second DL RS resource;
2. The first and second DL RS(s) are configured to the UE as desired (serving node) DL RS and interfering node DL RS, respectively; and
3. The first and second DL RS are CSI-RS.

The first RS may also refer to a first set of RSs. Similarly, the second RS may also refer to a second set of RSs. Further, the network may conFIG.ure a UE with one or more sets of CSI-RS measurement resources. Also, the network may indicate which CSI-RS measurement resource the UE will regard as being associated with its serving node. This indication may be either part of the configuration of the CSI-RS measurement resources or may be separately or dynamically signaled to the UE.

In another embodiment, the UE may be configured by downlink signaling to transmit either spatial QCL with a received first DL RS resource while not spatial QCL with at least one received second DL RS resource or only spatial QCL with a received first DL RS resource with no restriction on QCL assumptions for received second DL RS resource(s). In addition, Item 1 in the list above generally means that the UE may ensure that it does not unnecessarily interfere with the gNB that transmits the second DL RS resource.

Figure 9:
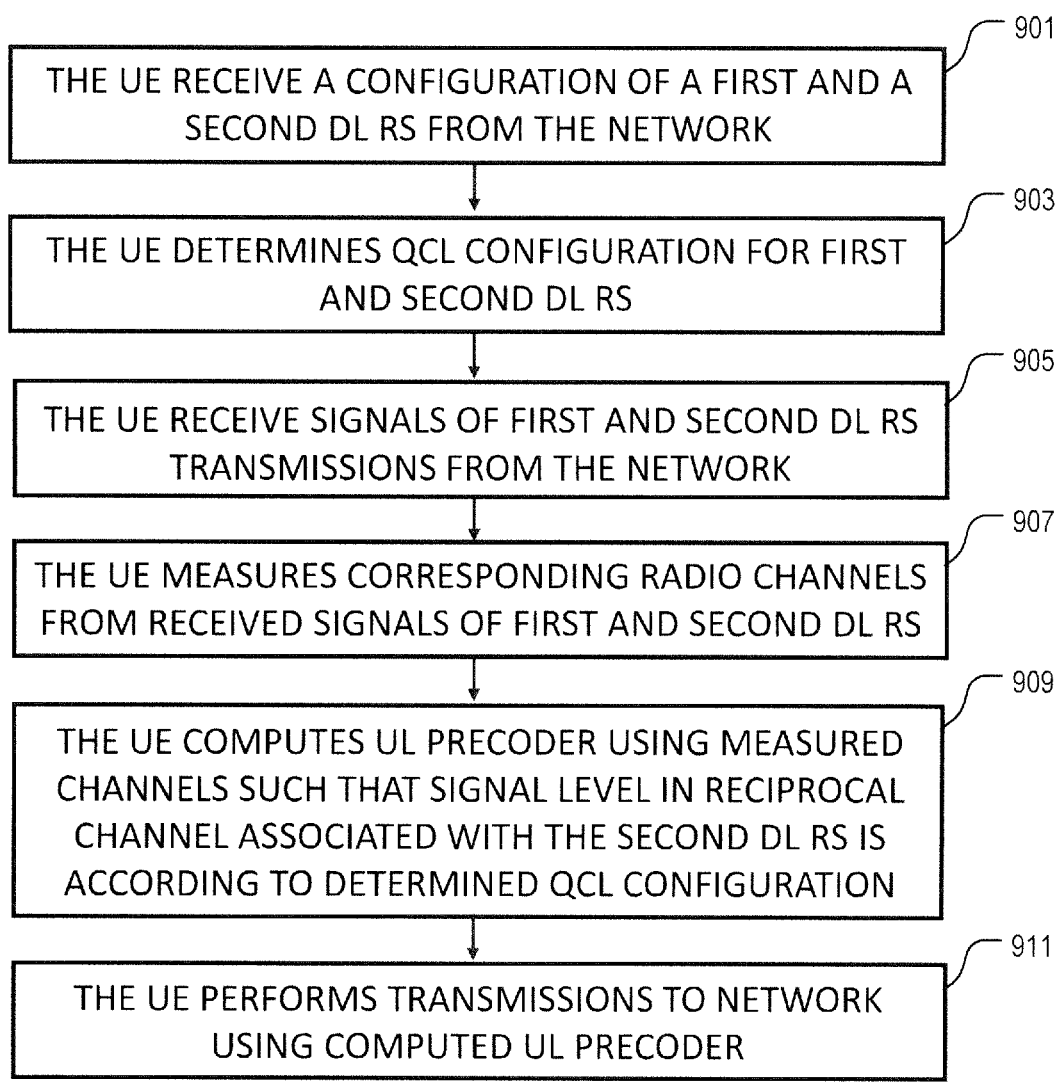
FIG. 9 illustrates another embodiment of a method by a wireless device of reducing interference in a wireless communication system in accordance with various aspects as described herein.

FIG. 9 illustrates another embodiment of a method 900 by a wireless device (e.g., UE) of reducing interference in a wireless communication system in accordance with various aspects as described herein. The wireless device performing this method 900 may correspond to any of the wireless devices 105, 200, 300a, 300b, 500, 1105, 1205, 1207 described herein. In FIG. 9, the method 900 may start, for instance, at block 901 where it may include receiving a configuration of a first and second downlink reference signal (DL RS) from a network node. At block 903, the method 900 may include determining a QCL configuration for the first and second DL RSs. At block 905, the method 900 may include receiving signals of the first and second DL RS transmissions from the network node. At block 907, the method 900 may include measuring corresponding radio channels from received signals of the first and second DL RSs. At block 909, the method 900 may include computing an uplink precoder using the measured radio channels so that a signal level in a reciprocal channel associated with the second DL RS is according to the determined QCL configuration. At block 911, the method 900 may include performing transmissions, to the network node, using the computed uplink precoder.

In another embodiment, the signal level in the reciprocal channel associated with the second DL RS may be reduced, if the first and second DL RSs are non-QCL, compared to an UL precoder determined from the first DL RS only.

In another embodiment, the UL transmission may be subject to uplink power control that is limited by an amount of interference the UL transmission is expected to cause on the reciprocal channel associated with the second DL RS that is non-QCL. In short, the uplink power control may be set to use as much power as available given that the interference on the channel of the second DL-RS that is non-QCL is kept below a certain threshold.

In another embodiment, the signal level in the reciprocal channel associated with the second DL RS may be increased, if the first and second DL RSs are QCL, compared to an UL precoder determined from the first DL RS only.

Figure 10:
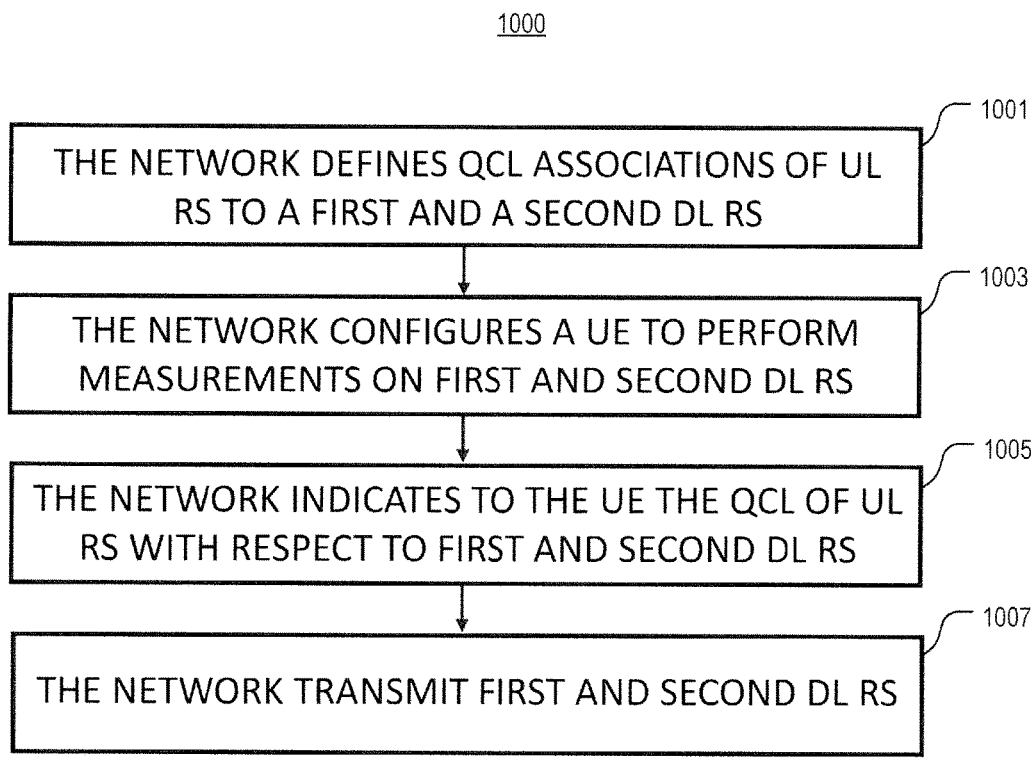
FIG. 10 illustrates another embodiment of a method by a network node of reducing interference in a wireless communication system in accordance with various aspects as described herein.

FIG. 10 illustrates another embodiment of a method 1000 by a network node (e.g., base station) of reducing interference in a wireless communication system in accordance with various aspects as described herein. The network node performing this method 1000 may correspond to any of the network nodes 101, 103, 600, 700a-b, 1101, 1103, 1201, 1203 described herein. In FIG. 10, the method 1000 may start, for instance, at block 1001 where it may include defining QCL associations of an uplink reference signal (UL RS) to a first and second DL RS. At block 1003, the method 1000 may include conFIG.uring a UE to perform measurements on the first and second DL RSs. At block 1005, the method 1000 may include transmitting, to the UE, an indication of the QCL of the UL RS with respect to the first and second DL RSs. At block 1007, the method 1000 may include transmitting the first and second DL RSs.

Figure 11:
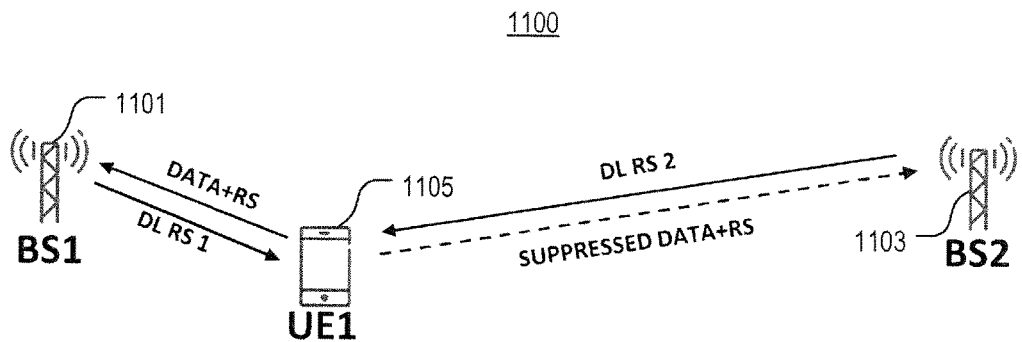
FIG. 11 illustrates another embodiment of a system for reducing interference in a wireless communication system in accordance with various aspects as described herein.

FIG. 11 illustrates another embodiment of a system 1100 for reducing interference in a wireless communication system in accordance with various aspects as described herein. In FIG. 11, the system 1100 includes first and second network nodes (BS1, BS2) 1101, 1103, and a first wireless device (UE1) 1105. The first network node 1101 may define QCL associations of an UL RS to first and second DL RSs (DL RS 1, DL RS 2). Further, the first network node 1101 may configure the first wireless device 1105 to perform measurements on the first and second DL RSs. The first network node 1101 may also transmit, to the first wireless device 1105, an indication of the QCL configuration of the UL RS with respect to the first and second DL RSs. The first network node 1101 may then transmit a first DL RS to the first wireless device 1105. Similarly, the second network node 1103 may transmit a second DL RS to the first wireless device 1105.

In FIG. 11, the first wireless device 1105 may receive the configuration of the first and second DL RSs from the first network node 1101. Further, the first wireless device 1105 may receive the QCL configuration for the first and second DL RSs (e.g., UL-RS is QCL with DL RS 1). The first wireless device 1105 may also receive the first and second DL RS transmissions from the respective first and second network nodes 1101, 1103. The first wireless device 1105 may then measure the radio channels of the first and second DL RSs and may compute an uplink precoder using the measured radio channels so that a signal level in a reciprocal channel associated with the second DL RS is according to the determined QCL configuration. The wireless device 1105 may then perform transmissions towards the first network node 1101 using the computed uplink precoder with such transmissions suppressed towards the second network node 1103.

Figure 12:
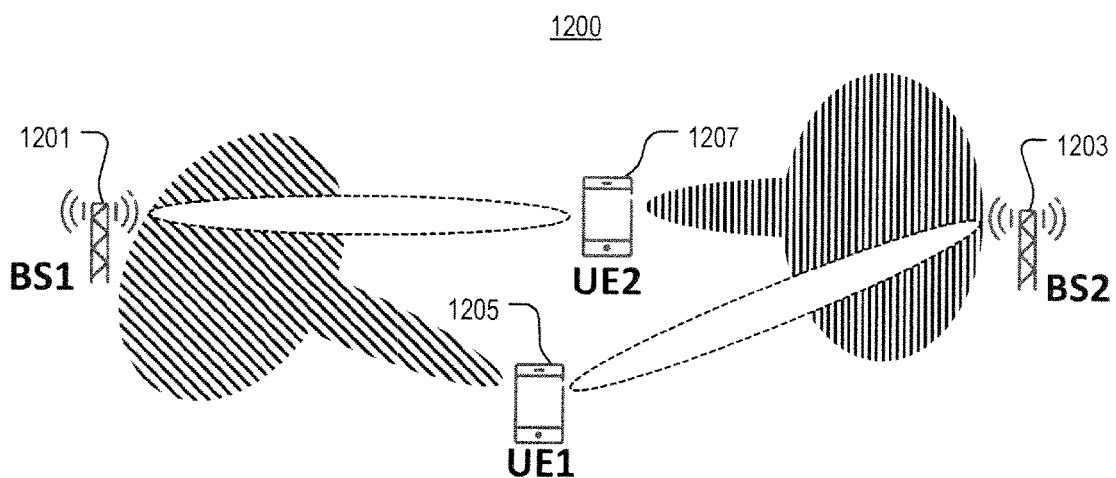
FIG. 12 illustrates another embodiment of a system for reducing interference in a wireless communication system in accordance with various aspects as described herein.

FIG. 12 illustrates another embodiment of a system 1200 for reducing interference in a wireless communication system in accordance with various aspects as described herein. In FIG. 12, the system 1200 includes first and second network nodes (BS1, BS2) 1201, 1203, and first and second wireless devices (UE1, UE2) 1205, 1207. The first wireless device 1205 may perform transmissions towards the first network node 1201 using a computed uplink precoder with such transmissions suppressed towards the second network node 1203. Similarly, the second wireless device 1207 may perform transmissions towards the second network node 1203 using a computed uplink precoder with such transmissions suppressed towards the first network node 1201.

In the following, further embodiments of the present disclosure are described. These embodiments may be combined with the above described embodiments.

With respect to QCL definitions, there has been some agreement in the last two 3GPP RAN WG1 meeting, where the highlights are listed here:

NR supports with and without a downlink indication to derive QCL assumption for assisting UE-side beamforming for downlink control channel reception
    FFS: details
        E.g., QCL assumption details
        E.g., indication signaling (e.g. DCI, MAC CE, RRC, etc.)
        E.g., beam-related indication for DL control and data channels
For downlink, NR supports beam management with and without beam-related indication
    When beam-related indication is provided, information pertaining to UE-side beamforming/receiving procedure used for data reception may be indicated through QCL to UE
The followings are defined as Tx/Rx beam correspondence at TRP and UE:
    Tx/Rx beam correspondence at TRP holds if at least one of the following is satisfied:
        TRP is able to determine a TRP Rx beam for the uplink reception based on UE's downlink measurement on TRP's one or more Tx beams.
        TRP is able to determine a TRP Tx beam for the downlink transmission based on TRP's uplink measurement on TRP's one or more Rx beams
    Tx/Rx beam correspondence at UE holds if at least one of the following is satisfied:
        UE is able to determine a UE Tx beam for the uplink transmission based on UE's downlink measurement on UE's one or more Rx beams.
        UE is able to determine a UE Rx beam for the downlink reception based on TRP's indication based on uplink measurement on UE's one or more Tx beams.
    More refined definition may still be discussed
Scheme B: Non-codebook based UL transmission
    Support frequency selective precoding for CP-OFDM when the number of transmission port is greater than Y (FFS: Value of Y).

Support the indication of DL measurement RS for UE to calculate candidate precoder Study the mechanisms for UL precoder determination, e.g. precoded SRS based, non-precoded SRS based, hybrid precoded and non-precoded SRS based In the following, we elaborate on the QCL for UL.

For nodes that have reciprocity-calibrated transmitter and receiver chains it may be useful to know when a signal that will be received is the reciprocal response to another signal that was transmitted earlier or vice versa. That is, assuming a node with analog beamforming is transmitting a SRS or a PRACH with some analog beam, when receiving a response to the sounding or PRACH the UE could expect the response to arrive through the reciprocal channel, for which the receiver beam could favorably be the same beam as was used for the reciprocal transmission. Likewise, the PRACH transmission may be a response to a received synchronization signal or a mobility RS.

Hence, the spatial QCL framework could be extended to also cover the use case of reciprocal responses for analog beamforming by defining the received signal to be reciprocally quasi co-located with the transmitted signal or vice versa.

Proposal 1: Support reciprocal and spatial quasi co-location at a node, where a transmitted signal received at a node and a transmitted signal from the same node, are spatially QCL.

In particular, when beam correspondence holds at the UE, then the UE could be signaled to transmit precoded SRS or a precoded PUSCH or PUCCH in the same direction as it has received a certain CSI-RS. Hence, the specification need to support reciprocal spatial QCL as in Proposal 1 and in particular:

Proposal 2: Support reciprocal spatial QCL at the UE between the reception of a CSI-RS resource and a transmitted signal such as an SRS resource, PUCCH or PUSCH.

This will ensure that a gNB knows the receive spatial correlation of a signal transmitted from the UE and it may thus adapt its receiver accordingly. For non-codebook based UL transmission of data, i.e. where precoding is decided by the UE, it has been agreed to support the indication of DL measurement RS for UE to calculate candidate precoder.

Proposal 3: In UL transmission scheme B, a DL indication defines which CSI-RS is reciprocally and spatially QCL with the scheduled PUSCH and PUCCH DMRS.

Whether this signaling is included in the DCI carrying the UL grant or configured by other means may be further discussed. In addition, whether additional signaling is needed, e.g. to indicate in DL which CSI-RS resource or other DL RS is QCL with the uplink transmission of other types such as SRS, PRACH or SR, or whether this may be implicitly assumed by specification text is FFS.

Moreover, when there is a problem with uplink interference where many UE transmit uplink data and sounding at the same time and the network is dense (many gNB in a small area) it is beneficial to reduce uplink interference by using uplink precoding based on channel reciprocity. The UL QCL framework and Proposal 1 may also be extended to cover this case:

Proposal 4: Support suppression of uplink interference towards victim gNB using precoded transmitted signals from the UE, by defining that the transmission is not spatially QCL (in reciprocal sense) with the reception of a CSI-RS resource transmitted from a victim TRP or gNB.

The transmitted signal could here be for example PUSCH, PUCCH or SRS. Again, whether additional explicit signaling is needed to indicate which CSI-RS resource are victim and which are desired needs further study as it may already fit under the agreed CSI framework.

Based on the discussion in this contribution we propose at least one of the following:

Proposal 1: Support reciprocal and spatial quasi co-location at a node, where a transmitted signal received at a node and a transmitted signal from the same node, are spatially QCL;

Proposal 2: Support reciprocal spatial QCL at the UE between the reception of a CSI-RS resource and a transmitted signal such as an SRS resource, PUCCH or PUSCH; and Proposal 3: Support suppression of uplink interference towards victim gNB using precoded transmitted signals from the UE, by defining that the transmission is not spatially QCL (in reciprocal sense) with the reception of a CSI-RS resource transmitted from a victim TRP or gNB.

ABBREVIATIONS

| Abbreviation | Explanation |
| --- | --- |
| 5G | 5th Generation mobile networks or wireless systems |
| 3GPP | 3rd Generation Partnership Project |
| BS | Base Station |
| CE | Control Element |
| CP | Cyclic Prefix |
| CP-OFDM | Cyclic Prefix Orthogonal Frequency Division Multiplexing |
| CRC | Cyclic Redundancy Check |
| CRS | Cell Specific Reference Signal |
| CSI | Channel State Information |
| CSS | Common Search Space |
| DCI | Downlink Control Information |
| DL | Downlink |
| DMRS | Demodulation Reference Signal |
| eNB | Evolved Node B (i.e., base station) |
| E-UTRA | Evolved Universal Terrestrial Radio Access |
| E-UTRAN | Evolved Universal Terrestrial Radio Access Network |
| DFT | Discrete Fourier Transform |
| DL | Downlink |
| FDD | Frequency Division Duplex |
| gNB | next generation Node B |
| IFFT | Inverse Fast Fourier Transform |
| IoT | Internet of Things |
| LTE | Long Term Evolution |
| MAC | Medium Access Control |
| MIMO | Multiple Input Multiple Output |
| MSR | Multi-Standard Radio |
| MTC | Machine-Type Communication |
| NB | Narrow-Band |
| NB-IoT | Narrow-Band Internet of Things |
| NB-LTE | Narrow-Band LTE (e.g., 180 KHz bandwidth) |
| NB-PBCH | NB-IoT Physical Broadcast Channel |
| NB-PSS | NB-IoT Primary Synchronization Sequence |
| NB-SSS | NB-IoT Secondary Synchronization Sequence |
| NR | New Radio |
| OFDM | Orthogonal Frequency Division Multiplexing |
| OFDMA | Orthogonal Frequency Division Multiple Access |
| PA | Power Amplifier |
| PAPR | Peak-to-Average Power Ratio |
| PBCH | Physical Broadcast Channel |
| PDCCH | Physical Data Control Channel |
| PDCP | Packet Data Convergence Protocol (PDCP) |
| PDU | Protocol Data Unit |
| PRACH | Physical Random Access Channel |
| PRB | Physical Resource Block |
| PSD | Power Spectral Density |
| PSS | Primary Synchronization Sequence |
| PUSCH | Physical Uplink Shared Channel |
| QCL | Quasi Co-Located |
| RACH | Random Access Channel |
| RAT | Radio Access Technology |

-continued

| Abbreviation | Explanation |
|---|---|
| RBR | Recommended Bit Rate |
| RF | Radio Frequency |
| RRC | Radio Resource Control |
| RS | Reference Signal |
| Rx | Receive |
| SoC | System-on-a-Chip |
| SC-FDMA | Single-Carrier, Frequency Division Multiple Access |
| SFBC | Space Frequency Block Coding |
| SIB | System Information Block |
| SIM | Subscriber Identity Module or Subscriber Identification Module |
| SNR | Signal to Noise Ratio |
| SRS | Sounding Reference Signal |
| SSS | Secondary Synchronization Sequence |
| TDD | Time Division Duplex |
| TRP | Transmission/Reception Point |
| Tx | Transmit |
| UE | User Equipment |
| UL | Uplink |
| USS | UE-specific Search Space |
| WB-LTE | Wideband LTE (i.e., corresponds to legacy LTE) |
| ZC | Zadoff-Chu algorithm |

The various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising a wireless device:
   determining an uplink precoder based on channel measurements on first and second downlink reference signal resources, the precoder enabling a transmission on an uplink reference signal resource that is precoded with the uplink precoder and that is quasi co-located (QCL) with a transmission on the first downlink reference signal resource but not QCL with a transmission on the second downlink reference signal resource;
   determining to increase or decrease a power level of a transmission on an uplink channel that is reciprocally associated with the second downlink reference signal resource responsive to determining that a transmission on the first downlink reference signal resource is not QCL with a transmission on the second downlink reference signal resource; and
   transmitting on the uplink channel that is reciprocally associated with the second downlink reference signal resource at the respective increased or decreased power level.

2. The method of claim 1, wherein the determining is so that the transmission on the uplink reference signal resource suppresses transmission on the uplink channel that is reciprocally associated with the second downlink reference signal resource.

3. The method of claim 2, wherein suppressing transmission on the uplink channel that is reciprocally associated with the second downlink reference signal is responsive to determining that the transmission on the uplink reference signal resource will not be QCL with the transmission on the second downlink reference signal resource.

4. The method of claim 1 further comprising transmitting an uplink reference signal on the uplink reference signal resource, wherein the uplink reference signal is precoded with the uplink precoder so that the transmission on the uplink reference signal resource is QCL with the transmission on the first downlink reference signal resource but not QCL with the transmission on the second downlink reference signal resource.

5. The method of claim 4, wherein the transmitting on the uplink reference signal resource precoded with the uplink precoder is so that the transmission on the uplink reference signal resource suppresses transmission on the uplink channel that is reciprocally associated with the second downlink reference signal resource.

6. The method of claim 1, further comprising determining that the transmission on the uplink reference signal resource will be QCL with the transmission on the first downlink reference signal resource but not QCL with the transmission on the second downlink reference signal resource.

7. The method of claim 6:
further comprising receiving, from a network node, an indication of a QCL configuration of the first and second downlink reference signal resources; and
wherein the determining that the transmission on the uplink reference signal resource will be QCL with the transmission on the first downlink reference signal resource but not QCL with the transmission on the second downlink reference signal resource is based on the received QCL configuration.

8. The method of claim 7, wherein the indication is associated with a configuration of reference signal measurement resources.

9. The method of claim 1, wherein the determining the uplink precoder comprises autonomously determining the uplink precoder based on the channel measurements on the first and second downlink reference signal resources.

10. The method of claim 1, further comprising receiving, from a network node, an indication that the first downlink reference signal is associated with that network node.

11. The method of claim 1 further comprising estimating first and second downlink channels based on the channel measurements of the respective first and second downlink reference signal resources, and wherein the determining the uplink precoder is based on the first and second downlink channels.

12. A wireless device, comprising:
processing circuitry comprising instructions executable by the processing circuitry whereby the wireless device is operative to:
determine an uplink precoder based on channel measurements on first and second downlink reference signal resources, the precoder enabling a transmission on an uplink reference signal resource that is precoded with the uplink precoder and that is quasi co-located (QCL) with a transmission on the first downlink reference signal resource but not QCL with a transmission on the second downlink reference signal resource;
determine whether to increase or decrease a power level of a transmission on an uplink channel that is reciprocally associated with the second downlink reference signal resource responsive to determining that a transmission on the first downlink reference signal resource is not QCL with a transmission on the second downlink reference signal resource; and
transmit on the uplink channel that is reciprocally associated with the second downlink reference signal resource at the respective increased or decreased power level.

13. A non-transitory computer readable recording medium storing a computer program product for controlling a wireless device, the computer program product comprising software instructions which, when run on processing circuitry of the wireless device, causes the wireless device to:
determine an uplink precoder based on channel measurements on first and second downlink reference signal resources, the precoder enabling a transmission on an uplink reference signal resource that is precoded with the uplink precoder and that is quasi co-located (QCL) with a transmission on the first downlink reference signal resource but not QCL with a transmission on the second downlink reference signal resource;
determine whether to increase or decrease a power level of a transmission on an uplink channel that is reciprocally associated with the second downlink reference signal resource responsive to determining that a transmission on the first downlink reference signal resource is not QCL with a transmission on the second downlink reference signal resource; and
transmit on the uplink channel that is reciprocally associated with the second downlink reference signal resource at the respective increased or decreased power level.

14. A method, comprising a network node:
determining that a transmission on an uplink reference signal resource will be quasi co-located (QCL) with a transmission on a first downlink reference signal resource but not QCL with a transmission on a second downlink reference signal resource;
transmitting, to a wireless device, an indication that a transmission on the uplink reference signal resource will be QCL with a transmission on the first downlink reference signal resource but not QCL with a transmission of the second downlink reference signal resource; and
receive, from the wireless device, a transmission on an uplink channel that is reciprocally associated with the second downlink reference signal resource at a power level that was increased or decreased by the UE responsive to determining that the transmission on the first downlink reference signal resource is not QCL with the transmission on the second downlink reference signal resource.

15. The method of claim 14, wherein the indication is associated with a configuration of reference signal measurement resources.

16. The method of claim 14, further comprising transmitting one or more downlink reference signals on at least one of the first and second downlink reference signal resources so that the wireless device can perform channel measurements on the one or more downlink reference signals on the first and second downlink reference signal resources to determine a precoder that enables a transmission on an uplink reference signal resource that is precoded with the uplink precoder and that is QCL with a transmission on the first downlink reference signal resource but not QCL with a transmission on the second downlink reference signal resource.

17. The method of claim 14, further comprising transmitting, to the wireless device, an indication that the first downlink reference signal is associated with the network node.

18. The method of claim 14 further comprising receiving an uplink reference signal transmitted on the uplink reference signal resource, wherein the uplink reference signal is precoded with a precoder that is QCL with the transmission on the first downlink reference signal resource but not QCL with the transmission on the second downlink reference signal resource.

19. The method of claim 14, wherein the first and second downlink reference signal resources are associated with channel state information reference signals.

20. The method of claim 14, wherein the QCL is at least one of a spatial QCL and a reciprocal QCL.

21. A network node, comprising:
processing circuitry comprising instructions executable by the processing circuitry whereby the network node is operative to:
determine that a transmission on an uplink reference signal resource will be quasi co-located (QCL) with a transmission on a first downlink reference signal resource but not QCL with a transmission of a second downlink reference signal resource;
transmit, to a wireless device, an indication that a transmission on the uplink reference signal resource will be QCL with a transmission on the first downlink reference signal resource but not QCL with a transmission of the second downlink reference signal resource; and
receive, from the wireless device, a transmission on an uplink channel that is reciprocally associated with the second downlink reference signal resource at a power level that was increased or decreased by the UE responsive to determining that the transmission on the first downlink reference signal resource is not QCL with the transmission on the second downlink reference signal resource.

22. A non-transitory computer readable recording medium storing a computer program product for controlling a network node, the computer program product comprising software instructions which, when run on processing circuitry of the network node, causes the network node to:
determine that a transmission on an uplink reference signal resource will be quasi co-located (QCL) with a transmission on a first downlink reference signal resource but not QCL with a transmission on a second downlink reference signal resource;
transmit, to a wireless device, an indication that a transmission on the uplink reference signal resource will be QCL with a transmission on the first downlink reference signal resource but not QCL with a transmission of the second downlink reference signal resource; and
receive, from the wireless device, a transmission on an uplink channel that is reciprocally associated with the second downlink reference signal resource at a power level that was increased or decreased by the UE responsive to determining that the transmission on the first downlink reference signal resource is not QCL with the transmission on the second downlink reference signal resource.

* * * * *